US012734463B2

(12) United States Patent
Zikeli et al.

(10) Patent No.: US 12,734,463 B2
(45) Date of Patent: Sep. 15, 2026

(54) THIN-LAYER TREATMENT DEVICE

(71) Applicant: AUROTEC GMBH, Regau (AT)

(72) Inventors: Stefan Zikeli, Regau (AT); Hannes Kitzler, Timelkam (AT); Philipp Zauner, Vöcklabruck (AT); Paul Aigner, Lenzing (AT); Michael Longin, Bad Mitterndorf (AT); Rainer Naef, Dietikon (CH)

(73) Assignee: AUROTEC GMBH, Regau (AT)

(*) Notice: Subject to any disclaimer, the term of this patent is extended or adjusted under 35 U.S.C. 154(b) by 198 days.

(21) Appl. No.: 18/440,704

(22) Filed: Feb. 13, 2024

(65) Prior Publication Data

US 2024/0189736 A1 Jun. 13, 2024

Related U.S. Application Data

(62) Division of application No. 17/596,390, filed as application No. PCT/EP2020/066249 on Jun. 12, 2020, now Pat. No. 12,102,939.

(30) Foreign Application Priority Data

Jun. 12, 2019 (EP) .................................... 19179678

(51) Int. Cl.

*B01D 1/22* (2006.01)
*B01D 1/00* (2006.01)
*D01D 1/02* (2006.01)

(52) U.S. Cl.

CPC ........... *B01D 1/228* (2013.01); *B01D 1/0082* (2013.01); *B01D 1/226* (2013.01); *D01D 1/02* (2013.01); *D10B 2201/22* (2013.01)

(58) Field of Classification Search

CPC ...... B01D 1/0082; B01D 1/226; B01D 1/228; D01D 1/02

See application file for complete search history.

(56) References Cited

U.S. PATENT DOCUMENTS 3,090,732 A 5/1963 Pinkwart et al.
3,292,683 A 12/1966 Buchi et al.
(Continued)

FOREIGN PATENT DOCUMENTS

CN 101636416 A 1/2010
CN 109432810 A 3/2019
(Continued)

OTHER PUBLICATIONS

Espacenet Machine Translation of DE 4117630 Obtained Nov. 1, 2023. (Year: 2023).*

(Continued)

*Primary Examiner* — Jonathan Miller

(74) *Attorney, Agent, or Firm* — Greer, Burns & Crain, Ltd

(57) ABSTRACT

A method for producing a cellulose solution with a solvent from a cellulose suspension in the solvent and a volatile non-solvent, including the introduction of the suspension into an inlet of a thin-film treatment apparatus, application and distribution of the suspension in a film-like form on a housing casing, temperature-controlled using a heat exchanger, by sweeper elements rotating about a common axis in a process housing of the treatment apparatus, evaporation of volatile non-solvent so that the cellulose is dissolved, and output of the solution of cellulose from the treatment apparatus through an outlet, wherein at least a part of the sweeper elements cause the cellulose to be advanced in the direction of the outlet so that the discharge at the outlet is between 300 kg/h and 600 kg/h cellulose solution per $m^2$ of the temperature-controlled surface of the housing casing.

24 Claims, 8 Drawing Sheets

(56) References Cited

U.S. PATENT DOCUMENTS

| | | | | |
|---|---|---|---|---|
| 3,695,327 | A | 10/1972 | Widmer | |
| 3,797,550 | A | 3/1974 | Latinen | |
| 4,361,462 | A | 11/1982 | Fujii et al. | |
| 4,981,554 | A | 1/1991 | Loconsolo et al. | |
| 5,185,060 | A | 2/1993 | Yamasaki et al. | |
| 5,656,224 | A * | 8/1997 | Zikeli | D01F 2/00 162/81 |
| 5,888,288 | A * | 3/1999 | Quigley | C08B 1/003 106/200.2 |
| 5,921,675 | A * | 7/1999 | Zikeli | D01D 1/02 366/186 |
| 10,532,292 | B2 | 1/2020 | Peters | |
| 10,821,414 | B2 | 11/2020 | Naef et al. | |
| 11,241,637 | B2 | 2/2022 | Naef et al. | |
| 12,102,939 | B2 * | 10/2024 | Zikeli | B01D 1/0082 |
| 2019/0247823 | A1 | 8/2019 | Naef et al. | |
| 2021/0046398 | A1 | 2/2021 | Naef et al. | |

FOREIGN PATENT DOCUMENTS

| | | | |
|---|---|---|---|
| DE | 4117630 | A1 | 12/1992 |
| DE | 4441468 | A1 | 5/1996 |
| DE | 10050997 | C1 | 12/2001 |
| EP | 0356419 | A2 | 2/1990 |
| GB | 952101 | A | 3/1964 |
| KR | 10-2010-0023903 | A | 3/2010 |
| WO | 93/11396 | A1 | 6/1993 |
| WO | 94/06530 | A1 | 3/1994 |
| WO | 94/28217 | A1 | 12/1994 |
| WO | 03/029329 | A2 | 4/2003 |
| WO | 2004/041420 | A1 | 5/2004 |
| WO | 2006/000197 | A1 | 1/2006 |
| WO | 2007/076979 | A1 | 7/2007 |
| WO | 2008/154667 | A1 | 12/2008 |
| WO | 2008/154668 | A1 | 12/2008 |
| WO | 2013/030399 | A1 | 3/2013 |
| WO | 2013/156489 | A1 | 10/2013 |

OTHER PUBLICATIONS

International Search Report and Written Opinion received for PCT/EP2020/066249, mailed Nov. 2, 2020.

Notice of Reasons for Rejection received in Korean Application No. 9-5-2022-080741257, dated Oct. 21, 2022.

Examination Report received in India Patent Application No. 202034003614, dated Jan. 6, 2023.

First Office Action received in Chinese Patent Application No. 202080046364.7, dated Feb. 11, 2023.

Examination Report received in India Patent Application No. 202137055262, dated May 9, 2023.

Office Action and Search Report received in Finnish U.S. Appl. No. 20/195,926, dated May 10, 2023.

Fernández, J., et al., "Recovery of Ionic Liquids from Wastewater by Nanofiltration," J Membra Sci Technol, 2011, Special Issue 4, 8 pages.

Hauru, L., et al., "Dry jet-wet spinning of strong cellulose filaments from ionic liquid solution," Cellulose 21, 2014, pp. 4471-4481.

Liu, Y., et al., "Low energy recycling of iconic liquids via freeze crystallization during cellulose spinning," Green Chemistry, 2018, pp. 493-501.

Parviainen, A., et al., "Sustainability of cellulose dissolution and regeneration in 1,5-diazabicyclo[4.3.0]non-5-enium acetate: a batch simulation of the IONCELL-F process," RSC Advances 5, 2015, pp. 69728-69737.

Zhang, S., et al., Regenerated Cellulose by the Lycocell Process, a Brief Review of the Process and Properties, BioResources 13(2), 2018, pp. 4577-4592.

* cited by examiner 10
12
14
16,160
18
20
22
25
32
36
38
40
48,480

22a'
22b'
86'
96
43,432
50
432
560
100'
92'
560
43,431
44
90'

THIN-LAYER TREATMENT DEVICE

RELATED APPLICATIONS

This application is a divisional of, and claims priority to U.S. patent application Ser. No. 17/596,390 filed on Dec. 9, 2021 which is a U.S. National Stage of and claims priority to International Application No. PCT/EP2020/066249 filed on Jun. 12, 2020, and which claims the benefit of European Application No. 19179678.8, filed Jun. 12, 2019, all of which are incorporated by reference.

BACKGROUND

The invention relates to a thin-film treatment apparatus for treating viscous material.

Generic thin-film treatment apparatuses are already known to the person skilled in the art and are used, for instance, in the distillation, concentration, devolatilisation, and drying of various materials. Furthermore, thin-film treatment apparatuses are also used for mixing and for reactions in which, at least temporarily, a viscous state is present, in particular, for instance, for polymerisation reactions. Thin-film treatment apparatuses are predominantly operated continuously.

A subgroup of thin-film treatment apparatuses is constituted by thin-film evaporators. These are based on the principle that, by distributing material on the inner face of a temperature-controllable housing wall, a high heat flow density can be obtained, whereby ultimately a large evaporative capacity and high evaporation ratios can be enabled in a single pass.

For the distribution of the material in a thin film, rotors fitted with wiper elements can in particular be provided. Appropriate thin-film evaporators which are additionally equipped with a material-conveying facility are known to the person skilled in the art, under the name Filmtruder.

A thin-film processing apparatus in the form of a Filmtruder is described, for instance, in CH 523 087, according to which in a heatable and/or coolable treatment chamber there is arranged coaxially a drivable rotor, which has a tubular body, on the circumference of which inclined vanes are evenly distributed and on which, moreover, wiper blades which reach axially into the vicinity of the inner face of the housing casing or touch the inner face are arranged. During operation, the material to be treated is grabbed by the wiper blades, which have been set in rotation, and is distributed in a thin film on the inner wall of the housing, while the obliquely positioned vane parts impart to the grabbed material a movement component which is directed toward the outlet DE 100 50 997 C1 describes a further thin-film evaporator. Here, a shaft, provided with scraper elements, for distributing the introduced substances on the inner side of the housing is arranged in a heating chamber, wherein the shaft has a bearing journal which is slidingly mounted in a bearing bush.

In addition to the thin-film evaporators which, during operation, are usually vertically oriented, further thin-film processing apparatuses are known to the person skilled in the art, such as thin-film dryers, which are generally horizontally oriented.

A corresponding thin-film dryer is described in DE 41 17 630, according to which, within a heat exchanger tube there is arranged an elongate vaned rotor, which conveys the material to be dried to the inner circumferential surface of the heat exchanger tube. In order to ensure a high flexural rigidity of the vaned rotor, a basket-like construction around the vaned rotor is proposed, comprising clamping ties running in the longitudinal direction of the vaned rotor and fastening flanges, between which the clamping ties are clamped. In order to additionally increase the restoring force when the vaned rotor deflects, radial spacers are distributed uniformly over the length of the vaned rotor between the fastening flanges. In addition, the vaned rotor is provided with a plurality of auxiliary vanes, which are mounted pivotably on the clamping ties of the vaned rotor and sweep over the material on the inner circumferential surface. The auxiliary vanes also contribute to the rigidification of the basket construction. However, they are not able to exert any radial force towards the axis of the vaned rotor because they are pivotably mounted and therefore cannot transfer a radial force. This construction signifies an additional effort when building the reactor and, depending on the material to be treated, a hindrance to the liquid flow from the inlet end to the outlet end.

WO 93/11396 relates to an evaporator device for heat treatment, in particular for drying sludges, with a heatable hollow-cylindrical evaporator body, which is oriented approximately horizontally and which at one end has a product inlet and at the other end has a product outlet. In the product-charged interior of the evaporator body there is arranged an externally drivable rotor provided with substantially radially oriented vanes.

Furthermore, WO 2004/041420 discloses a thin-film treatment apparatus in the form of a horizontally arranged mixing apparatus, in which the components to be mixed are distributed in a thin film on the inner wall of a hollow-cylindrical body, wherein the components are mixed together by interaction of the rotor blades with the inner wall of the hollow-cylindrical body.

GB 952,101 A discloses an evaporation device comprising a horizontal cylindrical vessel which defines an evaporation chamber. The evaporation device also has an agitator provided with agitation elements, which agitator is supported by an axle element arranged concentrically with the longitudinal axis of the vessel. The agitator and its drive unit are designed such that the material to be treated is flung against the wall of the evaporation chamber as the agitator rotates. In one embodiment, the agitator comprises six radially extending arms arranged uniformly distributed in the circumferential direction. The arms support axially extending, strip-shaped agitation elements, which are mounted adjustably at their ends and are turned inwards.

The horizontal thin-film treatment apparatuses described in the prior art are directed towards processes in which the material to be treated is brought into a dry state, in particular in which it can be converted into granules. For certain applications it is necessary to equip the thin-film treatment apparatus with a long rotor shaft. For instance, apparatuses which are designed to bring cellulose into solution and to produce, from this, for example what are known as Lyocell fibres have relatively long rotor shafts in the order of from 10 to 15 m in the process zone alone. This is because water evaporates first from the cellulose suspension fed into the apparatus, and the suspension evaporated in this way then has to be homogenised in order to obtain the sought quality of the solution. Such apparatuses designed for the Lyocell method are usually constructed vertically, as in the case of the Filmtruder, so as to ensure that, on account of gravity, an additional conveying component is provided and ultimately a good cleaning of the treatment surface of the apparatus is also achieved. However, the vertical design means that very tall premises have to be provided, in which the apparatus can be housed. The product feed likewise has to be set accordingly, since the feed point in the known, vertically oriented apparatuses is arranged at the top. The same is also true for the equipment, such as drive, heating and vacuum.

"Lyocell" is the generic name allocated by BISFA (The International Bureau for the Standardization of Man-Made Fibres) for cellulose fibres which are produced from cellulose without the formation of a derivative. The Lyocell method requires the dissolution of cellulose without chemically modifying it (see Zhang et al., BioResources 13(2), 2018: 4577-4592). This dissolution process can be performed in one or more stages.

Two-stage methods, as described for example in DE 4441468, have the disadvantage that the adjustment of the water-, solvent- and cellulose concentration in and between the two stages, which are performed in different pieces of equipment, specifically an evaporator for pre-evaporation and a horizontal screw dissolver, is difficult and non-uniform cellulose solutions which have poor properties for the further processing step of spinning are provided as a result. WO 2013/156489 A1 describes a similar two-stage method, wherein a base substance for moulded articles, for example a cellulose solution, is processed by processing the starting substances in a vertical thin-film evaporator and a thick-film dissolver (kneading reactor).

In order to avoid a two-stage apparatus, the entire dissolution process would have to be able to be completed in a single apparatus in a one-stage method. To this end, apparatuses of large dimensions are generally necessary. Examples for producing cellulose solutions by using vertical thin-film treatment apparatuses are described in EP 0356419 A2, in WO 94/06530 A1 and in WO 2008/154668 A1.

Due to the equipment-related and constructional outlay involved with the vertical design, a horizontal orientation of the thin-film treatment apparatus is desirable in principle. However, due to the inherent weight and the associated deflection of the rotor shaft on account of the force of gravity, trouble-free operation with identical process conditions as compared to those of a vertical installation are difficult to realise particularly in apparatuses having a relatively long rotor shaft.

The object of the present invention is therefore to provide a substantially horizontal thin-film treatment apparatus which ensures trouble-free operation, even when a relatively long rotor shaft is provided.

A further object of the present invention is to provide an effective dissolution process for cellulose, in which cellulose is transferred quickly, but fully, from a solid material into the dissolved state in a single apparatus, in particular a thin-film treatment apparatus. This process is preferably possible in a substantially horizontal thin-film treatment apparatus.

SUMMARY

The invention thus relates to a thin-film treatment apparatus for treating viscous material comprising

- a process housing oriented at an incline to the horizontal of at most 20° with a heatable and/or coolable housing casing, which surrounds a rotationally symmetrical housing interior extending in the axial direction and forming a material treatment space,
- an inlet nozzle arranged in an inlet zone of the process housing in order to introduce the material to be treated into the material treatment space,
- an outlet nozzle arranged in an outlet zone of the process housing in order to discharge the treated material from the material treatment space, and
- a drivable rotor shaft arranged in the housing interior and extending coaxially for producing a material film on the inner surface of the housing casing and for conveying the material in a direction from the inlet zone, via a process zone, to an outlet zone.

The rotor shaft comprises a central rotor shaft body and sweeper elements arranged on the circumference thereof, the radially outer end of said sweeper elements being distanced from the inner surface of the housing casing. These sweeper elements are generally arranged in a plurality of axially extending rows of blades which are distributed over the circumference of the rotor shaft and the number of which is dependent on the circumference of the rotor shaft body.

According to the invention the rotor shaft comprises at least one lift element arranged on the rotor shaft body, which lift element is designed in such a way as to produce a lifting force in the direction of the rotor shaft body during the rotation of the rotor shaft, as will be described further below.

The process housing, i.e. the longitudinal axis thereof, in accordance with the present invention is oriented at an incline to the horizontal by at most 20°, preferably is oriented at an incline by at most 10°, and particularly preferably is oriented horizontally, i.e. with an angle of inclination of at least approximately 0°. On account of the substantially horizontal orientation of the process housing of the apparatus according to the invention, the process housing is generally supported on appropriate support bearings in a proximal end region corresponding to the inlet zone and in a distal end region corresponding to the outlet zone. In addition, the rotor shaft arranged in the housing interior is mounted on appropriate rotary bearings in the proximal and distal end region, wherein preferably the rotary bearing takes up both radial and axial forces in the proximal end region and is designed as a radial bearing in the distal end region. As discussed further below, at least one lift element is arranged preferably in the centre of the rotor, that is to say in the region of maximum deflection.

In accordance with the invention it has surprisingly been found that a deflection of the rotor shaft caused by the force of gravity can be effectively counteracted by the lift element or lift elements arranged on the rotor shaft body. Thus, trouble-free operation can be ensured even for apparatuses with a relatively long rotor shaft, as are used in particular for the Lyocell method, also with horizontal orientation of the apparatus. The technical effect obtained in accordance with the invention is thus particularly pronounced for a thin-film treatment apparatus in which the housing interior forming the material treatment space extends over a length of at least 5 m, preferably at least 8 m. Gaps between sweeper elements and the inner surface of the housing casing which are comparable to those of a (vertically oriented) Filmtruder can thus be provided even for these lengths.

Furthermore, it was found during the course of the present invention that also in horizontal apparatuses a sufficiently good conveyance of very highly viscous materials can be achieved if the rotor shaft is equipped with appropriate conveying elements.

The sweeper elements arranged on the circumference of the rotor shaft body are thus embodied at least in part as conveying elements.

A part of the sweeper elements is generally provided in the form of conveying elements and a further part of the sweeper elements is provided in the form of distribution elements. In the context of the present invention sweeper elements that distribute the material primarily over the inner surface of the housing casing are referred to as "distribution elements", whereas sweeper elements that primarily impart on the material a conveying component towards the outlet nozzle are "conveying elements". It is also conceivable that sweeper elements act both in a conveying and also in a distributing manner; such sweeper elements are referred to in the context of the present invention as "conveying-and-distribution elements".

Distribution elements and conveying elements generally differ in that the shearing edge of the distribution elements in each case encloses an angle with the axis direction so as to be at least approximately neutral in respect of conveyance, whereas the shearing edge of the conveying elements is angled in relation to the axis direction in such a way that a conveying component in the direction of the outlet nozzle is imparted to the material. The shearing edge of the distribution elements in each case thus generally encloses an angle with the axis direction that is smaller than the angle enclosed by the shearing edge of the conveying elements with the axis direction. The angle enclosed by the shearing edge of a distribution element and the axis direction is preferably in each case less than 5° and in this specific case at least approximately 0°. By contrast, the angle enclosed by the shearing edge of a conveying element and the axis direction is in each case more than 15°.

Due to the presence of the conveying elements it is ensured on the one hand that also very highly viscous materials can be conveyed through the treatment chamber at a sufficiently high conveying rate. In addition to the fact that a high product capacity of the apparatus of up to 50,000 kg/h can be achieved, an increased product quality can also be obtained even for temperature-sensitive materials, because the residence time or the treatment time during which the material is exposed to elevated temperatures and high shear rates can be kept sufficiently short.

On the other hand, due to the presence of the distribution elements, a very good distribution and optimal surface regeneration on the inner surface of the housing casing (also referred to hereinafter as "treatment surface") is ensured also when the material has a very high viscosity.

Ultimately, an optimal treatment, in particular a high devolatilisation rate, of very highly viscous material can thus be achieved in accordance with the invention, and at the same time the energy input into the material can be limited to a level necessary for the particular method, at which level the material does not sustain any damage and in particular does not undergo any thermally induced degradation.

As mentioned, it is conceivable that the process housing is slightly inclined relative to the horizontal. It can thus be achieved that the material experiences a permitted backflow and thus remains in the process housing for longer, which may be desirable depending on the application.

The rotor shaft body of the apparatus according to the invention may in particular comprise a spindle and axially extending fastening strips distributed over its circumference, by means of which fastening strips the sweeper elements can be fastened to the spindle. However, it is also conceivable that the rotor shaft body instead of a spindle comprises a hollow shaft, with the sweeper elements distributed over the circumference of the hollow shaft.

The process housing, as mentioned, has a heatable and/or coolable housing casing, which surrounds a rotationally symmetrical housing interior extending in the axial direction. This housing interior forming the material treatment space of the apparatus is generally circular cylindrical, however an embodiment of the housing interior narrowing conically in the conveying direction or a housing interior that is circular cylindrical in a first region and narrows conically in a region situated downstream in the conveying direction are also conceivable.

The material treatment space in preferred embodiments can be divided into different zones according to the states which the material to be treated passes through during the processing, or the conditions and objectives of the treatment steps, specifically can be divided into an inlet zone (also referred to as a "feed zone"), a process zone, an outlet zone (also referred to as a "discharge zone"), and an optional post-processing zone. The process zone can additionally be divided into a distribution zone and into a conveying zone, wherein a good distribution and surface regeneration of the material on the inner surface of the housing casing lie at the forefront in the distribution zone, whereas primarily good material conveyance should be attained in the conveying zone. The inlet zone, process zone (in particular containing distribution zone and conveying zone), outlet zone and post-processing zone are generally arranged physically in succession. In this case the post-processing zone is arranged outside the process housing, but connected spatially thereto. It is also conceivable, however, that the post-processing zone is arranged before the outlet zone and thus in the process housing.

Whereas, for instance in an apparatus designed for the Lyocell method, the evaporation of water from the cellulose suspension with simultaneously good distribution and rapid transportation away of the material are at the forefront in the inlet zone, in the process zone the principal thermal treatment is to be realised by a purposefully set combination of distribution and conveyance, wherein water is additionally evaporated. It is primarily sought here in the distribution zone that the suspension transfers well into solution with increasing water evaporation. In the conveying zone following the distribution zone, a stronger conveying component in the direction of the outlet zone should be imparted to the material with largely dissolved cellulose, the material being discharged in the outlet zone via a corresponding outlet nozzle and subjected to a post-processing in a post-processing zone. The solution is homogenised in the post-processing zone by shearing and mixing with additional residence time. Whereas the cellulose in the process zone generally passes almost fully into solution, it is also conceivable that the process is performed such that the cellulose passes fully into solution only in the outlet zone or in the post-processing zone. As mentioned it is conceivable to arrange the post-processing zone optionally before or after the outlet zone.

Besides the fact that the apparatus according to the invention is suitable for the production of a cellulose solution, other applications are also conceivable, however, in which a viscous material is processed. The term "viscous material" is understood here in the context of the present invention to mean a material which has a viscosity, at least temporarily, of from 100 to 15000 Pas during the treatment in the apparatus according to the invention. The viscous material preferably contains a volatile substance which may be removed in the thin-film treatment apparatus (evaporated or sublimed).

As mentioned, the technical effect obtained in accordance with the invention is particularly pronounced with a material treatment space extending axially over a length of at least 3 m, preferably at least 8 m, and particularly preferably at least 10 m. The rotor shaft thus extends between the rotary bearings in the proximal and in the distal region preferably over a length of at least 4 m, preferably 10 to 15 m.

As discussed further below, it is particularly preferred to provide different configurations of the rotor shaft and/or the sweeper elements arranged on the rotor shaft depending on the zone so as to meet the objectives of the treatment step to be performed in the zone in question.

A housing casing cavity is generally formed in the interior of the housing casing and is intended to be passed through by a heat transfer medium for the purposes of heating and/or cooling. The housing casing typically has a housing casing inner wall and a housing casing outer wall with a gap in between, in which there is arranged a conducting spiral for conducting a heat transfer medium, typically steam or hot water. As discussed further below, it is in particular conceivable to provide two or more heat transfer circuits, which have separate conducting spirals from one another and thus are temperature-controllable independently of one another. It is thus possible to set the temperature of the inner surface of the housing casing desired for a particular zone of the thin-film treatment apparatus independently of the temperatures present in the other zones. In this regard it is also preferred to use steam as heat transfer medium in the process zone and hot water as heat transfer medium in the outlet zone.

In accordance with a preferred embodiment the lift element has a planar incident-flow portion with a leading end in the rotation direction which leading end is arranged at a greater distance from the inner surface of the housing casing than a region of the incident-flow portion trailing behind the leading end. A gap that narrows in a direction counter to the rotation direction is thus formed between the incident-flow portion and the inner surface of the housing casing. In accordance with a particularly preferred embodiment the incident-flow portion extends in a plane oriented at an incline to the tangent or tangential plane of the inner surface of the housing casing, whereby a gap that narrows continuously in a direction counter to the rotation direction is formed between the incident-flow portion and the inner surface of the housing casing. It is furthermore preferred that the angle between the tangent or tangential plane of the inner surface of the housing casing and the incident-flow portion lies in the range of from 15° to 30°, in particular at approximately 25°. Here, a "tangent" of the inner surface of the housing casing is understood to mean the tangent that touches the inner surface of the housing casing, which is circular in section, at the point that lies closest to the radially outermost end of the incident-flow portion. The gap formed between the inner surface of the housing casing and the incident-flow portion preferably narrows by a factor of more than 10.

As the rotor shaft rotates the material to be processed, which generally has a high viscosity, is now pressed into the gap, whereby the flow force of the rotor shaft acting on the incident-flow portion provides a hydrodynamic lift component perpendicularly to the incident-flow direction. This lift component is relatively high especially in the case of a relatively highly viscous material, in particular material with a viscosity higher than 100 Pas. A deflection of the shaft is thus effectively counteracted, wherein the effect is particularly pronounced when processing highly viscous material.

In order to ensure that a hydrodynamic lift component is obtained already at the time of start-up, it can be preferred, at least in the start-up phase, to introduce a partial flow of the material to be treated in a region of the thin-film treatment apparatus in which lift elements are present, in particular in the process zone. For this purpose, the thin-film treatment apparatus, in addition to the inlet nozzle in the inlet zone, can thus have a further inlet nozzle which is arranged downstream of the inlet zone and in particular is arranged in the process zone. The proportion of this partial flow in the total amount of material introduced into the apparatus is selected here in such a way that, on the one hand, a sufficiently high lift component is obtained, and, on the other hand, the residence time of the material in the thin-film treatment apparatus is still long enough to ensure the desired treatment. The proportion of the partial flow in the material introduced into the process zone is preferably approximately 20% or less, and therefore the proportion in the material introduced in the inlet zone is approximately 80% or more.

A lift effect that is particularly advantageous for the purposes of the invention is obtained for an incident-flow portion which covers an angular range of at least 10° of the circumference of the rotor shaft body, in particular an angular range of from 10° to 20°, and especially an angular range of approximately 12°.

In accordance with a particularly preferred embodiment at least a part of the lift elements is formed in each case by a sweeper element. This sweeper element thus performs the dual function, besides the function as a lift element, of also distributing the material to be treated (in the case of a sweeper element formed as a distribution element) or of additionally imparting to the material a conveying component in the direction of the material outlet (in the case of a sweeper element formed as a conveying element). The sweeper element forming the lift element particularly preferably functions as a conveying element and as a distribution element, that is to say is provided as a conveying-and-distribution element.

The lift element particularly preferably comprises an at least approximately pitched-roof-shaped web plate, the ridge of which runs at least approximately parallel to the axis direction of the rotor shaft. Due to the angled form, the web plate is thus divided into a first and second web plate surface, which lie in planes running obliquely relative to one another.

The leading first web plate surface in the rotation direction forms the incident-flow portion of the lift element. As mentioned above, this first web plate surface covers an angular range $\beta_1$ of at least 10°, in particular 10° to 20°, of the circumference of the rotor shaft body. The trailing second web plate surface generally covers an angular range $\beta_2$ of at least 15°, in particular 15° to 30°. The angular range $\beta$ covered by the entire web plate thus lies preferably in a range of from 25° to 50°.

The angle enclosed between the first and the second web plate surface lies preferably in a range of from 110° to 150°. The length ratio of the limb forming the incident-flow portion to the limb forming the trailing portion lies preferably in a range of from 1:0.5 to 1:0.8.

Depending on whether the sweeper element, besides its function as lift element, is intended to additionally serve primarily as a conveying element or as a distribution element, fins running in a different way can be arranged on the radial outer side of the web plate. The lift element thus has at least one helically running conveying fin on its outer surface for the case in which it is also intended to have a conveying effect. For the case in which the lift element should serve additionally as a distribution element, the fins are oriented to be neutral in respect of conveyance, in particular are oriented at right angles to the axis direction or with a maximum conveying angle of 5°.

A generally axially running shearing edge is provided as a result of the angled form of the web plate. Regardless of whether the primary further function of the lift element should be as a conveying element or as a distribution element, the material is in any case distributed on the inner surface of the housing casing on account of this shearing edge. If conveying fins are provided, both a conveying component and also a distribution component are generally provided by the web plate, and therefore in this case the web plate forms a conveying-and-distribution element. The shearing edge is preferably flush with the conveying fins and thus arranged at the same distance from the treatment surface as the radial outer edge of the conveying fins. Alternatively, the shearing edge can be set back in relation to the radial outer edge of the conveying fin and thus, as compared thereto, can be arranged at a greater distance from the treatment surface.

In accordance with a preferred embodiment at least a part of the lift elements is arranged in a region that lies centrally between the rotary bearings on which the rotor shaft is supported. In accordance with a specific embodiment this region lies in the process zone of the apparatus. The lift component provided by the lift elements thus is effective in the region or in the zone in which the deflection of the rotor shaft is strongest.

With regard to this embodiment it is also preferred that at least a part of the lift elements are arranged on the rotor shaft body helically offset from one another in the process zone. An optimal distribution of the lift force or the lift components provided by the individual lift elements can thus be attained over a portion of the process zone of arbitrary length.

Furthermore, it is preferred, especially in the process zone, that part of the lift elements form a conveying-and-distribution element. Specifically, at least one helically extending conveying fin is arranged on the radial outer side of the particular lift element, in particular of the web plate.

The radial outer edge of the conveying fin generally encloses an angle of greater than 45° with the axis direction. Even in the case of very highly viscous material, the conveying component provided by the lift element is thus sufficiently high to obtain a desired conveying rate through the material treatment space. The radial outer edge of the conveying fin preferably encloses an angle of at most 65° with the axis direction. In particular, the angle lies in a range of from 50° to 60°.

Besides the fact that the conveying effect of a conveying element is determined by the angle of attack of the radial outer edge of a conveying fin, the conveying effect of the lift element can be adjusted additionally via the number of the conveying fins or the distance between the conveying fins arranged in succession in the axis direction.

In accordance with a further preferred embodiment a concentric protective casing arranged between the inner surface of the housing casing and the rotor shaft body and at least approximately fully surrounding the rotor shaft body is formed in the inlet zone. As a result of this protective casing it is ensured that the material cannot drip or splash onto the rotor shaft body in the inlet zone, that is to say before the rise in viscosity occurring during the treatment.

In accordance with this preferred embodiment the material to be treated and the gaseous material components escaping during the treatment are thus guided in parallel flow, wherein it is also preferred that the material and the gaseous material components are guided in counter flow in the process zone adjoining the inlet zone. In the inlet zone the lower viscosity of the material and the risk of a possible "material entrainment" by the evaporating components is thus taken into consideration in respect of the equipment set-up, whereas in the subsequent process zone an optimal devolatilisation is attained, since contact between the material to be treated and a large part of the vapours is minimised.

In accordance with a particularly preferred variant of the above-described embodiment the protective casing is formed at least in part by a plurality of lift elements, in particular web plates, distributed in the circumferential direction. The lift component sought in accordance with the invention is thus attained also in the inlet zone.

The web plates arranged in the inlet zone also have preferably on their radial outer side at least one helically extending conveying fin, so as to in particular in this region attain a high conveying rate and thus counteract a build-up of material.

Here it is also preferred that a radially set-back channel is formed in each case between two lift elements, in particular web plates, arranged in succession in the circumferential direction. The vapours escaping during the processing of the material may thus be guided through this channel and, once the end of the protective casing has been reached, pass through the interior surrounded by the protective casing to a space separated from the treatment chamber, where they then can be removed via a vapour extractor.

In accordance with a further preferred embodiment a concentric protective casing arranged between the inner surface of the housing casing and the rotor shaft body and at least approximately fully surrounding the rotor shaft body may also be formed in the process zone and/or in the outlet zone, in particular a protective casing which is formed at least in part by a plurality of lift elements distributed in the circumferential direction. Due to the presence of a protective casing, material is prevented also in these zones from being able to drop onto the rotor shaft body and remain on the unheated rotor shaft body be being "frozen on". This embodiment is advantageous in particular when the material to be treated also in the process zone or the outlet zone does not have a viscosity that is sufficiently high to completely prevent the material from trickling down or dripping down. This is relevant in particular during start-up or shutdown or in the case of malfunctions of the apparatus. It may also be preferred to design the rotor shaft to be heatable so as to prevent material that is dropped onto the rotor shaft body from freezing on. In other words, in this preferred embodiment means for heating the rotor shaft, in particular the rotor shaft body, are thus provided.

Besides the mentioned lift elements, which preferably also have the function of a conveying element, a distribution element, or a conveying-and-distribution element, the rotor shaft in accordance with a further preferred embodiment has further sweeper elements, which comprise radially protruding teeth, which generally are fixed in each case on one of a plurality of axially extending flanges arranged on the hollow shaft. Such sweeper elements generally do not bestow any lift component on the rotor shaft, or only a negligible lift component.

Depending on the orientation of the shearing edge of the teeth in relation to the axis direction, a distribution element or a conveying element is formed by the corresponding sweeper element, as has already been described similarly in conjunction with the lift elements. A sweeper element of which the teeth have a shearing edge enclosing an angle with the axis direction of less than 15°, in particular less than 5°, thus forms a distribution element, whereas in the case of an angle between the shearing edge and axis direction of equal to or greater than 15°, in particular equal to or greater than 45°, the sweeper element forms a conveying element.

In accordance with a specific embodiment, sweeper elements in which said angle lies in a range of from 15° to 30°, and especially is approximately 20°, are provided as sweeper elements functioning as conveying elements. For instance, it is conceivable that the teeth have a radially inner portion, which lies in a plane running parallel to the axis direction and via which the teeth are flange-mounted, and a radially outer portion, which lies in a plane running at an incline to the axis direction and the radially outer end of which forms the shearing edge.

Depending on the application and alternatively to this embodiment, it may be preferred that the shearing edge of at least a part of the sweeper elements encloses an angle smaller than that stated above and runs in particular at least approximately parallel to the axis direction, i.e. encloses an angle of approximately 0° with the axis direction. In the latter case these sweeper elements functioning as distribution elements are neutral in respect of conveyance and have exclusively a distributing function. The decision as to which specific configurations of the sweeper elements is selected is dependent ultimately on the material to be treated and may vary.

As mentioned, the distribution between distribution elements and conveying elements is heavily dependent on the intended purpose of the apparatus and the zone in question. In accordance with a preferred embodiment, the ratio of the number of conveying elements to the number of distribution elements for instance is greater in the conveying zone than in the distribution zone, since in the conveying zone the conveyance of the material is attributed an increased level of importance.

In accordance with a further preferred embodiment the distribution elements are arranged in alternation with the conveying elements in the circumferential direction of the rotor, since a very homogeneous distribution of the material on the treatment surface may thus be ensured.

In the outlet zone adjoining the process zone the material is then discharged from the treatment space via the outlet nozzle, wherein a configuration of the rotor shaft which cleans the housing inner wall and sweeps the product into a conveying member that branches off downwardly may be used. For instance, it is conceivable that the conveying member is provided in the form of a vertically arranged cone, in which the material attains a sufficient feed height to be discharged by a screw or more preferably a gear pump. It is furthermore conceivable that a spiral is applied to the rotor shaft in the distal end region, that is to say immediately before the end cover of the process housing, which spiral conveys the material not collected by the outlet nozzle and the discharge system arranged downstream thereof back towards the outlet nozzle and away from the distal end.

Depending on the application, it is additionally preferred and conceivable to provide a separate discharge system for the discharge. It is conceivable in particular that the outlet nozzle leads into a discharge system in the form of a single discharge screw or a twin discharge screw, preferably with axis direction transverse to the axis direction of the process housing. The purpose of this discharge system is to feed the treated material or the product to a pump which builds up the pressure for a downstream processing, in the case of a Lyocell solution in particular for the downstream filters and spinning nozzles. To this end, additional booster pumps may also be used.

In the case of a discharge system in the form of a twin discharge screw, it may additionally be preferred to equip this with kneading and/or dispersing blocks, whereby a high shearing is attained, which ultimately results in an additional homogenisation and in the case of the Lyocell method to a solution of smallest particles in the material mass.

The discharge system can comprise either a horizontally or vertically extending conveying direction. A discharge pump is generally associated with the discharge system, in the outlet-side region of said system, via which discharge pump the material that is to be discharged is removed or can be fed to further apparatuses, such as a filter and/or a spinning nozzle.

In particular, it is conceivable that the discharge system has a vertically extending conveying direction and a funnel with a discharge shaft which is arranged therein, extends coaxially and has a single discharge screw, at least in some regions. This embodiment has the advantage that the rotational speed of the rotor shaft present in the process housing can be decoupled from that of the discharge shaft in the discharge system.

Alternatively, it is also conceivable to provide a discharge system which comprises a funnel, the axis of which coincides with the axis of the rotor shaft. In particular, it is conceivable here that the rotor shaft protrudes into the funnel and has a single discharge screw in a cylindrical funnel portion adjoining a conical funnel portion in the conveying direction.

In accordance with a further preferred embodiment the thin-film treatment apparatus additionally comprises a cleaning apparatus which is designed in such a way that it can be introduced into the process housing when the end cover is opened and is movable to and fro in the axis direction. For instance, it is conceivable that the cleaning apparatus for this purpose has appropriately positioned brushes or high-pressure water jets. Especially for the above-described embodiment in which a longitudinally running vapour channel is formed in the inlet zone between two web plates arranged in succession in the circumferential direction, a rapid and simple cleaning of the thin-film treatment apparatus may thus be ensured. In particular, a complex disassembly of the apparatus in order for the cleaning apparatus to reach the points that are to be cleaned can be avoided.

It is furthermore conceivable to arrange a plate-like cleaning element on the rotor shaft body, directly adjacently to the distal, i.e. front side of the process housing, which cleaning element prevents material from depositing on the inner face of the distal end face and which also protects the distal rotary bearing from being soiled by the material.

As mentioned, the apparatus according to the invention is designed in particular for thermal fractionation of a substance mixture, and is provided in particular in the form of a thin-film evaporator, a thin-film dryer, or a thin-film reactor, preferably in the form of a thin-film evaporator.

The apparatus makes it possible for materials having a viscosity of up to 15000 Pa·s to be optimally treated, in particular devolatilised and in some cases also reacted, whether in combination with the devolatilisation or independently thereof.

Typically, the viscosity of the material to be treated with the apparatus according to the invention lies in the range of from 100 to 5000 Pa·s, in particular from 300 to 3000 Pa·s, and especially from 500 to 1,000 Pa·s. The viscosity values relate here to the operating temperature and a shear rate of $D=10\ sec^{-1}$.

Furthermore, the apparatus is particularly well suited in particular for the treatment of relatively temperature-sensitive materials, because the thermal energy to which the material is exposed may be set optimally by the relatively low selectable temperature and residence time on the treatment surface.

As mentioned, the thin-film treatment apparatus according to the invention is suitable in particular for the production of a cellulose solution, especially a cellulose solution for the production of Lyocell fibres.

Specifically, the operating temperature of the thin-film treatment apparatus according to the invention lies generally in a range of from 80 to 120° C., in particular from 90 to 115° C., and especially from 100 to 110° C.

In order to transfer the cellulose solution in the best-possible way into a homogeneous solution, it has been found that the production (for example as described below) may be performed ideally under vacuum (pressure p, in mbar), for instance in accordance with the stated formula (p=122.e^−(0.05 c(Cell))). The cellulose concentration ("c(Cell)", in mass %) herein is preferably from 6%-20%, in particular from 10%-15%. In these concentration ranges an efficient, quick and substantially complete dissolution of the cellulose was possible.

The circumferential speed of the rotor shaft of the thin-film treatment apparatus according to the invention lies generally in a range of from 6 to 12 m/s, in particular from 8 to 10 m/s.

In a further aspect the present invention relates to a method for producing a solution of cellulose with a solvent from a suspension of cellulose in the solvent and a volatile non-solvent, comprising the introduction of the suspension into an inlet of a thin-film treatment apparatus, application and distribution of the suspension in a film-like form on a housing casing, temperature-controlled using a heat exchanger, by sweeper elements rotating about a common axis in a process housing of the thin-film treatment apparatus, evaporation of volatile non-solvent so that the cellulose is dissolved, and output of the solution of cellulose from the thin-film treatment apparatus through an outlet, wherein at least part of the sweeper elements cause the cellulose to be advanced in the direction of the outlet. The advance is particularly preferably such that the discharge at the outlet is at least 300 kg/h, especially preferably at least 350 kg/h, of cellulose solution per m$^2$ of the surface of the temperature-controlled (using a heat exchanger) housing casing (inner wall).

The sweeper elements according to the invention, in particular with conveying elements, allow a rapid advance of the cellulose suspension or the resultant solution in a Lyocell method. This enables a rapid treatment, dissolution and discharge of the cellulose or cellulose solution. For example, in accordance with the invention and in the examples (see the table, row ac) it has been shown that an amount of from 145.8 kg/h and per m$^2$ to 887.5 kg/h and per m$^2$ can be produced—in a thin-film treatment apparatus on a laboratory scale with a surface of the housing casing temperature-controlled using a heat exchanger (also 'heat exchanger surface') of 0.55 m$^2$. These are essentially greater amounts for example than described for example in EP 0356419 A2 (72 kg/h in an apparatus of similar size). In order to attain an economically viable size of the dissolver apparatus depending on the amount of cellulose solution at the discharge, it has been found that an amount of more than 300 kg/h cellulose solution per m$^2$ temperature-controlled surface is advantageous. From an amount of approximately 600 kg/h and per m$^2$, the tests showed that the solution quality (homogeneity) is lower.

It can thus be concluded that by setting the sweeper elements for rapid product conveyance—as is necessary in the case of a horizontal orientation on account of the absence of a conveyance component provided as a result of the force of gravity—an efficient dissolution process for cellulose is made possible. Surprisingly, with the treatment driven in a forward direction in the process housing a highly efficient dissolution process is also brought about, which, within the scope of the Lyocell method, is able to transfer cellulose from a heterogeneous suspension into a homogeneous cellulose solution quickly and completely. The quality of the obtained cellulose solution satisfies the preconditions for a shaping process in the Lyocell method, such as spinning to form filaments. These advantages in principle are independent of the horizontal set-up. Although the apparatus according to the invention has been developed for horizontal support, the advantages in respect of the application are also provided in a vertical orientation, in particular if highly viscous suspensions or solutions are processed. This aspect of the invention is therefore independent of the orientation of the process housing, although here as well of course the horizontal orientation is preferred.

The advance by the sweeper elements in the direction of the outlet is preferably such that the discharge at the outlet is 300-600 kg/h, preferably 350 kg/h-550, especially preferably between 380 and 480 kg/h cellulose solution (fully treated material in the process housing) per m$^2$ of the surface of the housing casing temperature-controlled using a heat exchanger.

The advance may be adjusted for example via the number of sweeper elements relevant for the advance (conveying elements as described above), their angle and the rotation speed of the conveying elements. The angle enclosed in each case by the shearing edge of a conveying element and the axis direction is preferably more than 15°, preferably 15° to 30°, especially preferably approximately 20°. At least one third of the sweeper elements are preferably a conveying element.

The division according to the invention into different treatment zones (inlet zone, process zone and outlet zone) is furthermore particularly advantageous and has a positive effect on the quality of the obtained cellulose solution that is moved quickly forwards with the advance according to the invention.

In the inlet zone the temperature of the material, in particular the suspension, is preferably at least 10° C. lower than in the process zone. The aforementioned pitched-roof-shaped web plates are preferably provided in the inlet zone. The formation of clumps at the inlet of the suspension into the apparatus may thus be effectively avoided, and efficient transport of the material and a vapour stream in parallel flow may be ensured. A layer of suspension that is as uniform as possible is applied in the inlet zone over the inner surface of the housing casing.

The conveying elements and distribution elements described beforehand and hereinafter are provided in particular in the process zone. Here, the ratio of the conveying elements to distribution elements is preferably between 2:1 and 1:2, wherein sweeper elements having both functions (conveying-and-distribution elements) are assigned to both groups. The ratio of the lengths of the outer shearing edges, that is to say of the radially outer ends of the elements which are in contact with the suspension, is preferably coordinated in addition or alternatively. The ratio of the sum of the lengths of the outer shearing edges of the conveying elements to the sum of the lengths of the outer shearing edges of the distribution elements is preferably between 2:1 and 1:2.

In the outlet zone there are preferably no conveying elements or only a few conveying elements, that is to say almost exclusively distribution elements. Preferably at most 10% of the sweeper elements in the outlet zone are conveying elements and/or at least 90% of the sweeper elements are distribution elements without a conveying function. These proportions may also be interpreted, as above, on the basis of the sum of the lengths of the outer shearing edges of the sweeper elements. In other words at most 10% of the sum of the lengths of the outer shearing edges of the sweeper elements are preferably assigned to conveying elements and/or at least 90% of the sum of the lengths of the outer shearing edges of the sweeper element are assigned to distribution elements.

The length ratios of the zones are preferably in the range of 5%-25% inlet zone, 50%-90% process zone, the remaining 5%-25% accounting for the outlet zone.

Alternatively to the above embodiment, however, according to which no conveying elements or only few conveying elements are provided in the outlet zone, it can be preferred, in those cases in which the discharge system has a horizontally extending conveying direction, to provide sweeper elements which exert a conveying component onto the material. In particular, it can be preferred that web plates according to the above description are arranged on the rotor shaft body in the distal end region of the outlet zone or in the discharge system, which web plates function on the one hand as a lift element, but on the other hand also as conveying-and-distribution elements. It is thus taken into account that the force of gravity component does not take effect when the discharge system is oriented horizontally. Due to the presence of conveying-and-distribution elements in the stated portions, however, an efficient discharge of the material is ensured also for these horizontal discharge systems, specifically even if the material to be discharged has a relatively high viscosity.

It is also particularly preferred for this embodiment that the web plates are arranged on the rotor shaft body helically offset from one another in the longitudinal portion of the rotor shaft corresponding to the distal end region of the outlet zone.

The product amount at the outlet is dependent on the fed suspension amount, but is slightly lower on account of the evaporation of non-solvent in the process housing. The evaporated non-solvent is preferably not discharged at the outlet of the cellulose solution (highly viscous liquid mass), but instead is preferably guided in the vapour phase in counter flow to the flow of the cellulose suspension and is therefore removed in the vicinity of the inlet.

The housing casing (inner wall) is preferably temperature-controlled using a heat exchanger. The heat of a hot fluid which accrues in the Lyocell method may be used economically by the heat exchanger to heat the apparatus. The heat exchanger or the inner wall of the housing casing (process housing) is preferably heated to a temperature of from 90° C. to 130° C. In particular at least the process zone is directly temperature-controlled. Waste heat from the process zone may be used to heat the inlet and outlet zones, which are thus temperature-controlled indirectly by the heat exchanger. Heat carrier media in the heat exchanger may be water, oil or steam. Alternatively, the temperature may also be controlled via electrical heating.

The length of the housing casing from the inlet to the outlet temperature-controlled using a heat exchanger is preferably 0.5 m or more, preferably 1 m to 20 m, for example 4 m to 18 m, or 6 m to 17 m, or 8 m to 16 m, preferably 10 to 15 m. A greater length, with the same treatment time of the suspension, enables a quicker advance or a higher throughput of material and thus production amounts.

An essential criterion for the possible volumes to be treated in the process housing is the surface therein used for the treatment of the suspension, that is to say the surface under the influence of the heat exchanger that brings about the evaporation of the non-solvent by heating. The surface of the housing casing temperature-controlled using a heat exchanger is preferably 0.5 $m^2$ to 150 $m^2$, for example 1 $m^2$ to 140 $m^2$, 2 $m^2$ to 130 $m^2$, 5 $m^2$ to 120 $m^2$, 10 $m^2$ to 100 $m^2$, 15 $m^2$ to 80 $m^2$, preferably 60 $m^2$ to 125 $m^2$. Due to the horizontal support according to the invention, structural reasons for size limits in vertical thin-film treatment apparatuses (such as building height) are no longer relevant, since simple handling of the thin-film treatment apparatus is made possible in the horizontal plane.

The volume and the corresponding specific loading of the individual treatment zones in one embodiment according to the invention are as follows:

| Zone | Volume in the thin-film treatment apparatus in $dm^3$ | Specific loading in $kg/h/dm^3$ |
|---|---|---|
| Inlet zone | 1.3-1.5 | 76-378 |
| Process zone | 1.5-1.9 | 66-262 |
| Outlet zone | 3-4 | 2-125 |

It was found that an ideal homogeneous cellulose solution was achieved by a specific suspension feed in a tested thin-film treatment apparatus. The introduced suspension or solution (in kg/h) divided by the provided volume (in $dm^3$) is expedient as general comparable characteristic value. This gives what is known as the 'specific loading'. This specific loading is defined by the introduced mass flow divided by the provided volume in the individual zones, that is to say specific loading=mass flow/volume of the zone.

The method provides the best solution qualities at a specific loading in the inlet zone of 76-378 $kg/h/dm^3$, in the process zone of 66-262 $kg/h/dm^3$, in the outlet zone of 2-125 $kg/h/dm^3$ and in the post-processing zone of 0-500 $kg/h/dm^3$. In preferred embodiments the mean treatment time (time from inlet to outlet) of the cellulose in the process housing is at least 20 s, preferably 30 s to 1000 s. The treatment time is influenced by the advance rate and the length of the process housing, in particular the part thereof equipped with a heat exchanger. For example, the treatment time is 60 s to 900 s or 70 s to 800 s or 80 s to 700 s or 90 s to 600 s or 100 s to 500 s or 110 s to 400 s or 120 s to 350 s or 130 s to 300 s. The treatment time is preferably at most 350 s, particularly preferably at most 300 s.

The sweeper elements are preferably rotated at a speed of at least 50 revolutions per minute. Since the sweeper elements rotate about the common axis by the rotation of the rotor shaft body, the speed also corresponds to the rotation speed of the rotor shaft body. The speed of the sweeper elements is preferably at least 50 revolutions per minute, more preferably at least 100 revolutions per minute, more preferably at least 200 revolutions per minute, more preferably at least 300 revolutions per minute, more preferably at least 350 revolutions per minute, more preferably at least 400 revolutions per minute, more preferably at least 450 revolutions per minute, more preferably at least 500 revolutions per minute or at least 550 revolutions per minute, or any range within these values or thereabove, preferably 50 to 800 revolutions per minute.

The radially outermost end of the sweeper elements is preferably moved at a speed of 1.5 m/s to 12.5 m/s. The movement is implemented by the rotation of the sweeper elements. The radially outermost end of the sweeper elements is in contact with the suspension and processes same.

The (one or more) sweeper elements are preferably moved at a frequency of 1500 to 4000 per min in succession over a portion of a housing casing temperature-controlled using a heat exchanger. This parameter is also referred to as blade succession frequency and specifies how many sweeper elements per min sweep over a portion. It is determined by the number of radially arranged sweeper elements and the rotation speed. Different zones may have different numbers of radially arranged sweeper elements. Since sweeper elements may be arranged offset on the rotor and as a result there may be overlaps of the offset arrangements in the rotation direction, some portions (also within the same zone) may also be subject to a higher blade succession frequency. The specified frequency of from 1500 to 4000 per min is preferably achieved in regions without overlaps by offset arrangements, and in the process zone. The frequency 1800 to 3000 per min is preferred.

Directly successive sweeper elements preferably follow on from one another with a spacing of from 100 mm to 300 mm between the radially outermost ends of the sweeper elements. This distance is also referred to as the blade tip spacing. This spacing is preferably also selected in regions without overlaps by offset arrangements and/or is provided in the process zone. The blade tip spacing is preferably 150 mm to 280 mm or 180 mm to 260 mm or 190 mm to 250 mm or 200 mm to 240 mm.

The shear rate of the suspension applied and distributed in a film-like form as a result of the effect of the sweeper elements is preferably 3000 $s^{-1}$ to 30000 $s^{-1}$, particularly preferably 4000 $s^{-1}$ to 28000 $s^{-1}$, 5000 $s^{-1}$ to 26000 $s^{-1}$, 6000 $s^{-1}$ to 24000 $s^{-1}$, 7000 $s^{-1}$ to 22000 $s^{-1}$, 8000 $s^{-1}$ to 20000 $s^{-1}$ or 10000 $s^{-1}$ to 30000 $s^{-1}$, 11000 $s^{-1}$ to 28500 $s^{-1}$, 12000 $s^{-1}$ to 27000 $s^{-1}$, 12000 $s^{-1}$ to 25500 $s^{-1}$, 13000 $s^{-1}$ to 24000 $s^{-1}$. Due to the shearing, the suspension is thoroughly mixed and mechanically processed, which accelerates the evaporation of the non-solvent and contributes to the production of a thoroughly mixed, homogeneous solution.

Preferably, 1.5 kg/h to 30 kg/h suspension per sweeper element, preferably 5 kg/h to 20 kg/h suspension per sweeper element are introduced at the inlet. 20 to 5000 sweeper elements are preferably provided, for example 25 to 4000 or 30 to 3000 or 40 to 2000 sweeper elements. Preferably 300 kg to 100000 kg, preferably 10000 kg to 50000 kg suspension are introduced per hour.

In the Lyocell method a preferred film thickness (layer thickness) of the suspension in the process zone is 1 mm to 50 mm, preferably 2.0 mm to 15 mm, particularly preferably 2.2 mm to 5 mm. The layer thickness may be controlled by the introduced suspension amount and the processing speed (rotation rate, number of sweeper elements, in particular of the conveying elements, angle thereof and thus the advance). This is also controlled by the spacing of the radially outermost end of the sweeper elements from the inner surface of the housing casing. This spacing is preferably on average in the range of from 1 mm to 50 mm, preferably 2.0 mm to 15 mm, particularly preferably 2.2 mm to 5 mm.

In preferred embodiments a sweeper element is in contact with the suspension or solution on average over an area of from 0.8 $dm^2$ to 2 $dm^2$.

In preferred embodiments the rotor blade tip loading area is a key variable for the active treatment area of the suspension. This in turn has a very great influence on the quality of the cellulose solution at the discharge. This rotor blade tip loading area represents the sum of the end face of all sweeper elements and conveying elements (jointly 'rotor blades') in the process zone. The end or 'tip' thereof is formed by an area referred to as the 'end area'. The end area is any area of a sweeper or conveying element which is opposite the inner surface of the housing casing. Usually, the sweeper and conveying elements have an area at their tip (maximum distance from the rotor axis) which follows the contour of the inner surface of the housing casing and runs at a constant distance therefrom. The surface opposite the inner surface of the housing casing is of relevance in particular in the treatment zone in the case of the sweeper and conveying elements, less so in the case of lift elements. It has been found that this parameter (see the table, ad) is approximately 0.02 $m^2$ in the tested thin-film treatment apparatus. This parameter is greater in accordance with the requirements of a large-scale facility, preferably in the range of 0.02 $m^2$-6 $m^2$, particularly preferably in the range of 2 $m^2$-6 $m^2$ and particularly preferably in the range of 4 $m^2$-6 $m^2$. A favourable performance of the drive unit of the rotor is achieved in these ranges. At the same time the discharged cellulose solution shows a very good quality in respect of completeness of the dissolution of the cellulose and homogeneity of the cellulose solution. A further parameter is the engaging-tip power (see the table, af). This is calculated from the introduced amount of suspension in kg per second, with reference to the sum of the end area of the sweeper and conveying elements in the process zone in $m^2$. The best cellulose qualities are achieved if this parameter is in the range of 1.10-1.40 $kg/sm^2$. At higher values, for example above 5.5 $kg/sm^2$, the homogeneity of the discharged mass/solution at the outlet deteriorates. The engaging-tip power is a key parameter for determining the design parameter of the present method. This is determined in particular by the amounts of input suspension per unit of time. If too much suspension is introduced, the method is thus overstressed and the cellulose does not dissolve in a sufficient amount in the solvent. This means that the processes downstream of the method function poorly or not at all.

The suspension preferably has a film thickness (layer thickness) according to the formula $s=(\ln(m_s/60))/x$, wherein s is the film thickness in mm, $m_s$ is the conveyed flow of the suspension, and x is a constant from 0.45 to 7, preferably of 0.5866. This film thickness is preferably achieved in the process zone.

Of course, these parameters may be combined with one another. For example, it is particularly preferred if the discharge at the outlet is at least 300 kg/h, especially preferably at least 350 kg/h, cellulose solution per $m^2$ of the surface of the temperature-controlled (using a heat exchanger) housing casing (inner wall); and the mean treatment time (time from inlet to outlet) of the cellulose in the process housing is at least 150 s, preferably 150 s to 1000 s; and the (one or more) sweeper elements are moved in succession over a portion of the housing casing, temperature-controlled using a heat exchanger, at a frequency of from 1500 to 4000 per min (sweeper element frequency) and/or the shear rate of the suspension applied and distributed in a film-like form by the effect of the sweeper elements is 3000 $s^{-1}$ to 30000 $s^{-1}$.

The common axis of the rotating sweeper elements is preferably inclined by at most 20° to the horizontal. Although, with regard to the method, when the parameters according to the invention are observed, in particular the advance, improved production of a solution is achieved even without horizontal orientation, this orientation is preferred nonetheless. The thin-film treatment apparatus as described above is therefore used in the method according to the invention—in each of the described particular or preferred embodiments—without necessarily providing the horizontal orientation.

The solvent is an agent for dissolving cellulose. Here, high temperatures are usually used, for example 70° C. or more, in particular 75° C. or more or 78° C. or more. It is usually mixed with a non-solvent, that is to say a substance that cannot dissolve cellulose, so as to obtain a suspension and later the solution, wherein the mixing is also suitable for dissolving cellulose. Here, amongst other things, high proportions of the solvent are necessary in the mixture, for example 60% (mass %) or more—depending on the solvent this may be different, and the proportion may be easily determined by a person skilled in the art in dissolution tests.

The cellulose solution preferably has a cellulose concentration in amounts usual for Lyocell methods. The cellulose concentration in the cellulose solution may thus be 4% to 23%, preferably 6% to 20%, in particular 8% to 18%, or 10% to 16% (all percentages specified in mass %).

The absolute pressure in the reactor is preferably less than 100 mbar, in particular between 40 mbar and 70 mbar.

The solvent of cellulose is preferably a tertiary amine oxide (amine-N-oxide), particularly preferably N-methylmorpholine-N-oxide. It may alternatively or additionally be an ionic solvent. Such ionic solvents are described for example in WO 03/029329; WO 2006/000197 A1; WO 2007/076979 A1; Parviainen et al., RSC Adv., 2015, 5, 69728-69737; Liu et al., Green Chem. 2017, DOI: 10.1039/c7gc02880f; Hauru et al., Zellulose (2014) 21:4471-4481; Ferndndez et al. J Membra Sci Technol 2011, S:4; etc. and preferably contain organic cations, such as ammonium, pyrimidium, pyridinium pyrrolidinium or imidazolium cations, preferably 1,3-dialkyl-imidazolium salts, such as halides. Water is also preferably used here as an added non-solvent. A solution of cellulose and 1-butyl-3-methylimidazolium (BMIM), for example with chloride as counter ion (BMIMCl), or 1-ethyl-3-methyl-imidazolium (also preferably as chloride, acetate or diethylphosphate), or 1-hexyl-3-methylimidazolium or 1-hexyl-1-methylpyrrolidinium (preferably with a bis(trifluoromethylsulfonyl) amide anion), and water is particularly preferred. Further ionic solvents are 1,5-diazabicyclo[4.3.0]non-5-enium, preferably as acetate; 1-ethyl-3-methylimidazolium acetate, 1,3-dimethylimidazolium acetate, 1-ethyl-3-methylimidazolium chloride, 1-butyl-3-methylimidazolium acetate, 1-ethyl-3-methylimidazolium diethylphosphate, 1-methyl-3-methylimidazolium dimethylphosphate, 1-ethyl-3-methylimidazolium formate, 1-ethyl-3-methylimidazolium octanoate, 1,3-diethylimidazolium acetate and 1-ethyl-3-methylimidazolium propionate.

A suspension that is processed preferably in the method according to the invention contains between 58 and 75.3 mass % N-methylmorpholine-N-oxide (NMMNO or NMMO), between 19 and 26.1 mass % water, and between 5.7 and 15.9 mass % cellulose. The production of cellulose solutions with up to 20 mass % cellulose or more is possible.

The present invention will be further illustrated with reference to the accompanying figures.

DETAILED DESCRIPTION

Figure 1:
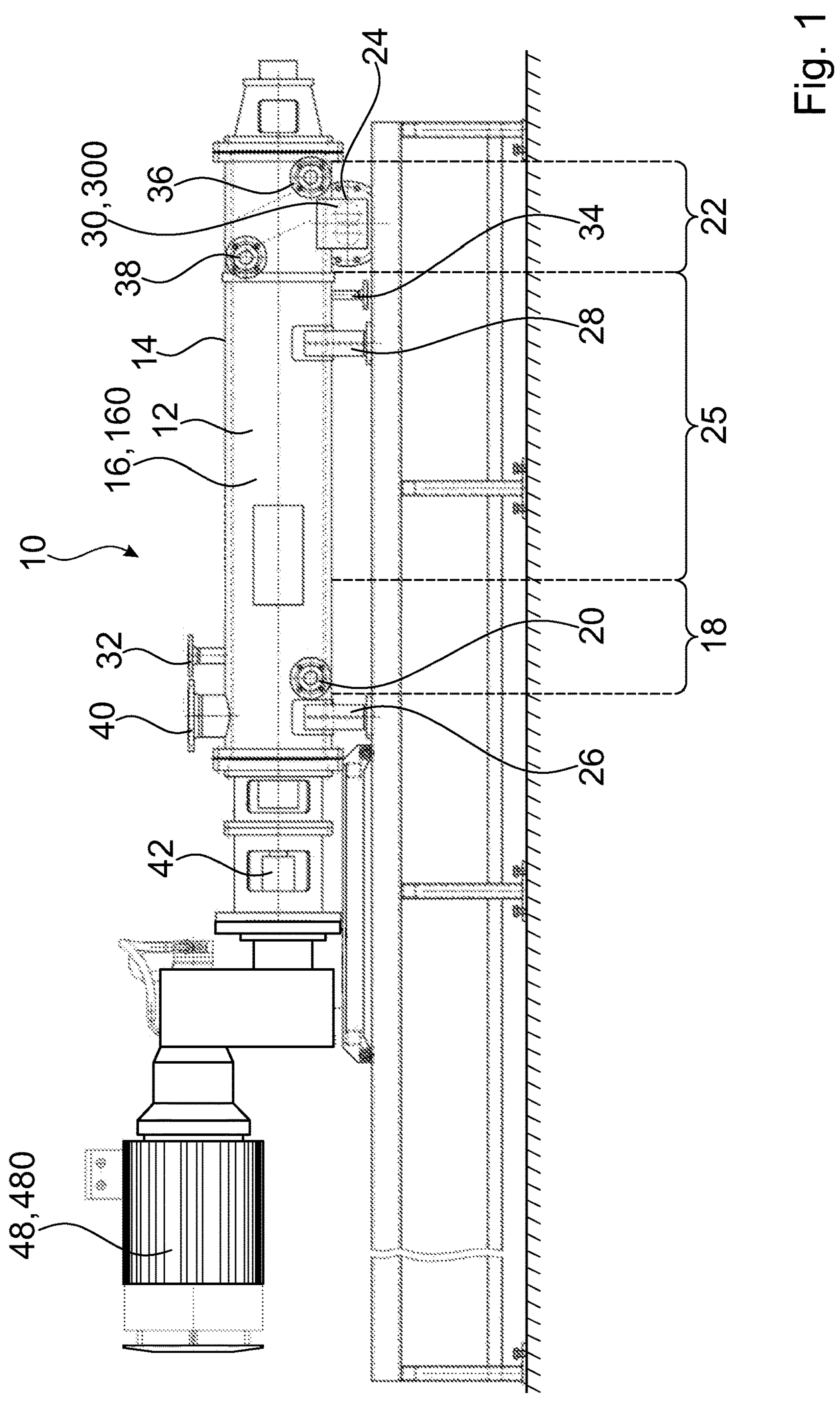
FIG. 1 shows a schematic depiction of a thin-film treatment apparatus according to the invention in a side view.
Figure 2:
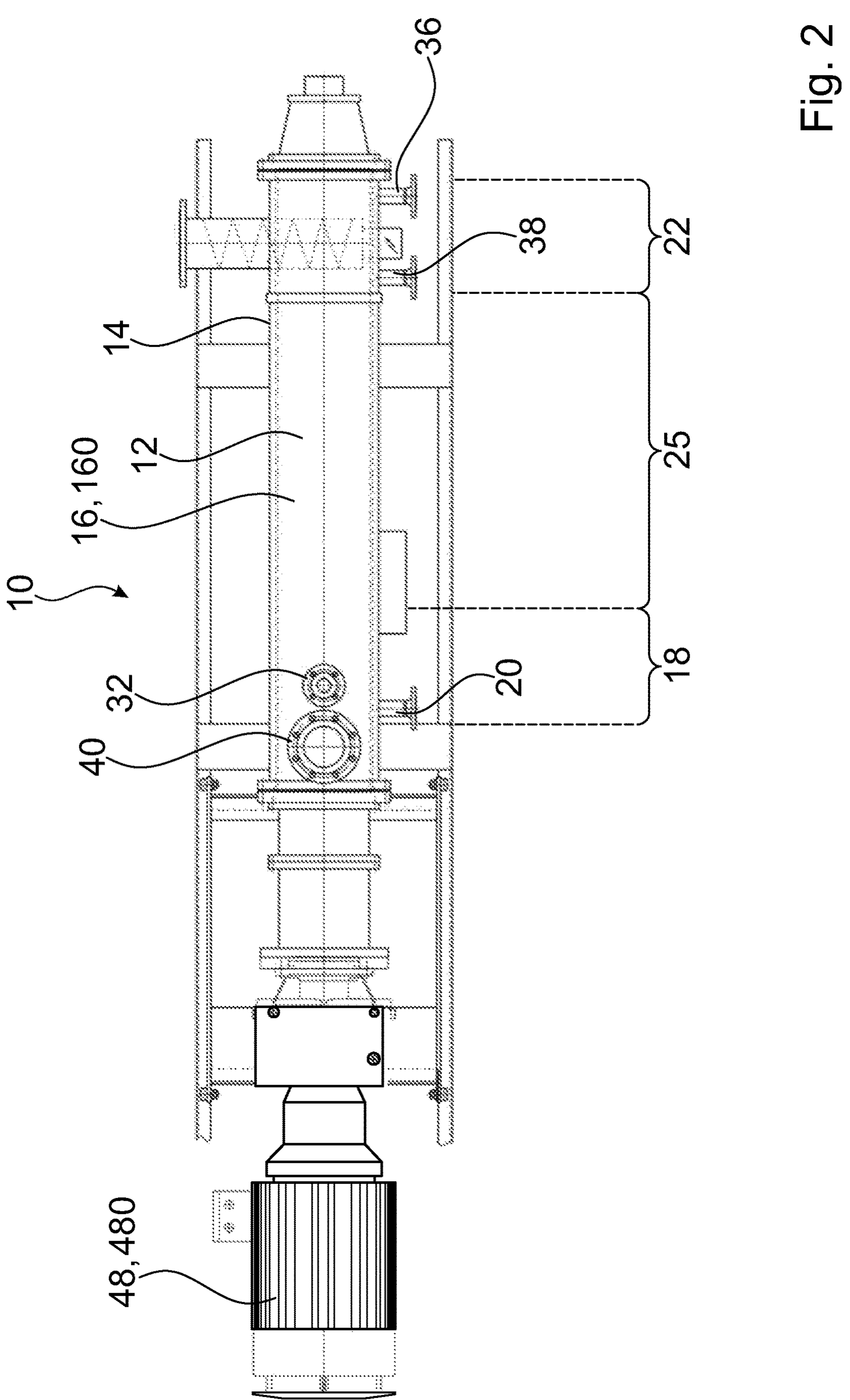
FIG. 2 shows the thin-film treatment apparatus shown in FIG. 1 in a view from above.

The thin-film treatment apparatus 10 shown in FIG. 1 has a process housing 12 with a housing casing 14 which encloses a circular cylindrical housing interior 16 extending in the axial direction. This housing interior forms the material treatment space 160.

In a proximal end region of the process housing 12 there is arranged an inlet nozzle 20 for introducing the material that is to be treated into the material treatment space 160, whereas an outlet nozzle 24 for discharging the material from the material treatment space 160 is arranged in a distal end region of the process housing 12. The proximal end region thus corresponds to the inlet zone 18 of the process housing, whereas the distal end region corresponds to the outlet zone 22. A process zone 25 lies between the inlet zone and the outlet zone.

The process housing 12 is supported via appropriate support bearings in the proximal and in the distal end region, specifically via a fixed bearing 26 in the proximal end region and a floating bearing 28 in the distal end region.

Figure 3:
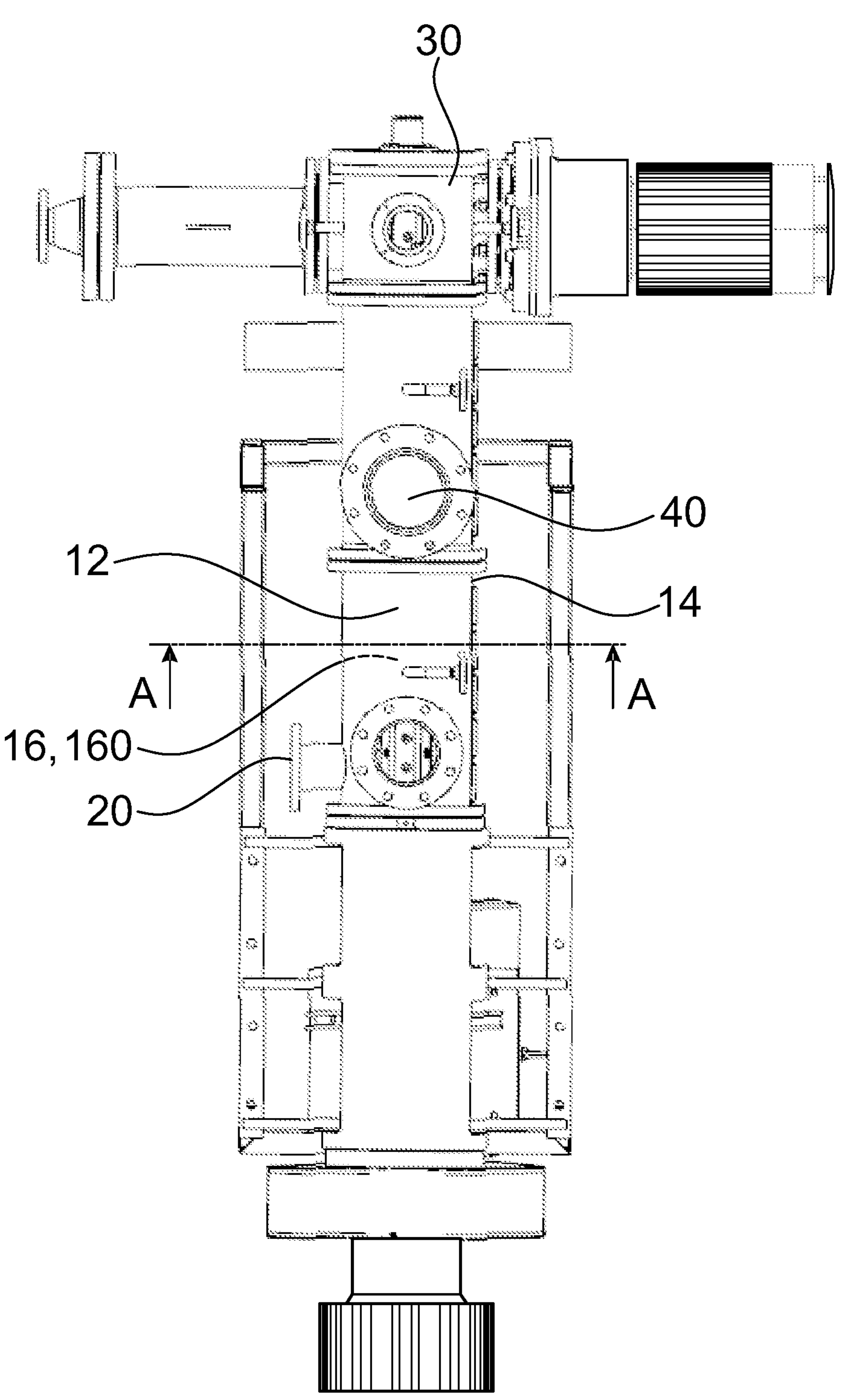
FIG. 3 shows a further thin-film treatment apparatus from above.

The inlet nozzle 20 is arranged tangentially to the housing casing 14 in the shown embodiment and leads in the lower half into the material treatment space 160, as can be seen in particular from FIG. 3.

The outlet nozzle 24 is configured in the shown embodiment in the form of an opening which leads at the lowermost point of the housing casing 14 into a discharge system 30 arranged immediately therebelow, in this specific case into a twin discharge screw 300 with conveying direction running at a right angle to the axis direction of the process housing 12.

The housing casing 14 is double-walled in the shown embodiment, has a housing casing inner wall and a housing casing outer wall with an intermediate gap, in which there is arranged a conducting spiral for conducting a heat exchange medium, typically steam or hot water. In the specific case shown two heat transfer circuits are provided: a first heat transfer circuit with a first heat transfer medium inlet 32 in the inlet zone or in the inlet-side region of the process zone 25 and a first heat transfer medium outlet 34 in the outlet-side region of the process zone 25, and a second heat transfer circuit with a second heat transfer medium inlet 36 in a distal region of the outlet zone 22 and a second heat transfer medium outlet 38 in the proximal region thereof. The two heat transfer circuits have conducting spirals separate from one another and are thus temperature-controllable independently of one another. To this end a separate heating element and cooling element (not shown) for controlling the temperature of the heat transfer medium are assigned to each heat transfer circuit, the heat transfer medium is introduced from there via a heat transfer pump via the heat transfer medium inlet 32 or 36 into the corresponding conducting spiral. For instance it is conceivable that steam is used as heat transfer medium in the first heat transfer circuit associated with the process zone 25 and that hot water is used as heat transfer medium in the second heat transfer circuit associated with the outlet zone 22.

In addition, an upwardly running vapour nozzle 40 is arranged in the housing casing 14, via which vapour nozzle the low-boiling constituents may be removed from the material treatment space 160.

Figure 4:
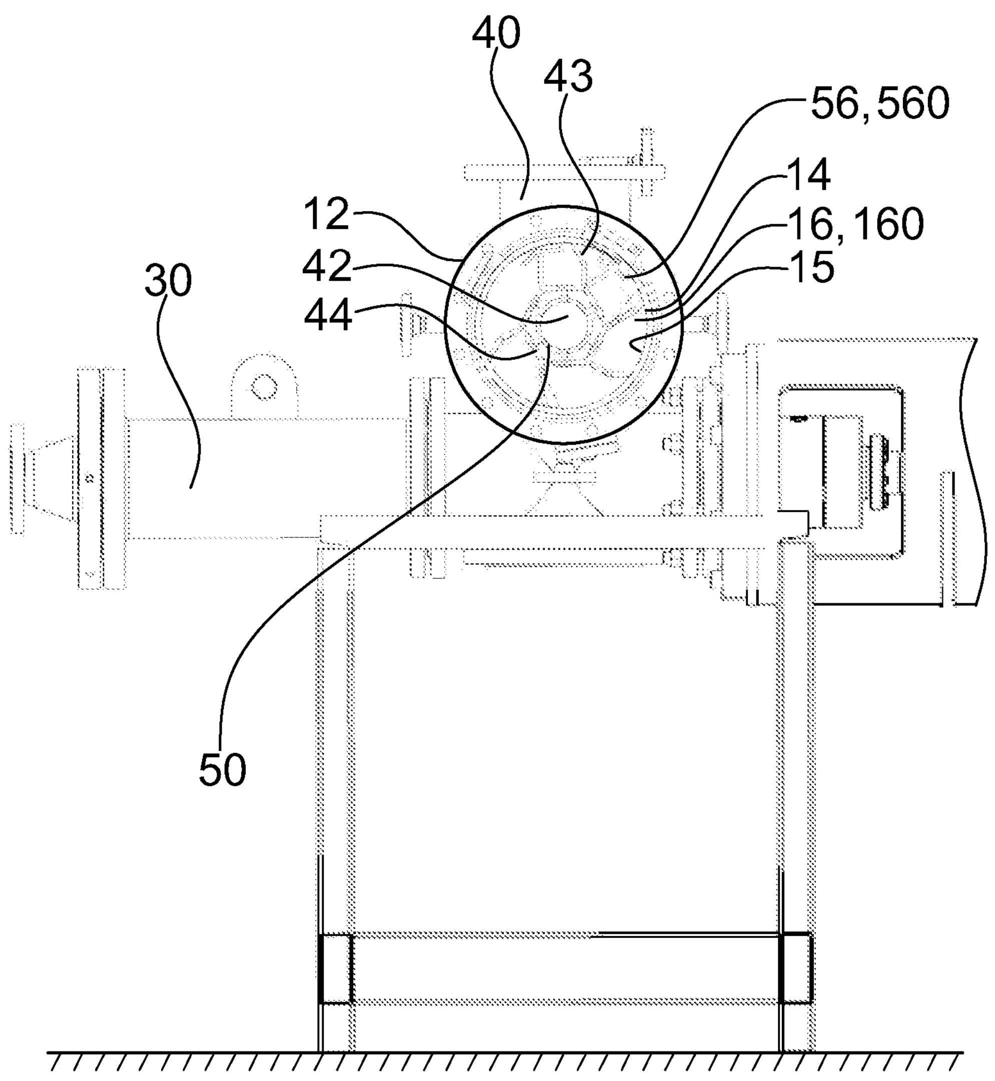
FIG. 4 shows the process housing of the thin-film treatment apparatus shown in FIG. 3 in cross-section through the plane A-A of FIG. 3.

The apparatus additionally has a rotor 42, which comprises a drivable rotor shaft 44, arranged in the housing interior 16 and extending coaxially, for generating a material film on the inner surface 46 of the housing casing, as shown for example in FIG. 4.

The rotor 42 for this purpose has a drive 48, which preferably is speed-variable. In the specific case shown a spur gear motor 480 is provided, which acts on a driveshaft portion of the rotor shaft 44 in order to set the rotor shaft in rotation. The driveshaft portion is sealed here with respect to the material treatment space 160 by way of a mechanical seal.

The material film is produced on the inner surface 15 of the housing casing and the material is conveyed in the direction of the outlet nozzle via sweeper elements 43, which are divided into distribution elements 431 and into conveying elements 432 depending on their primary function, as also described further below.

Figure 5:
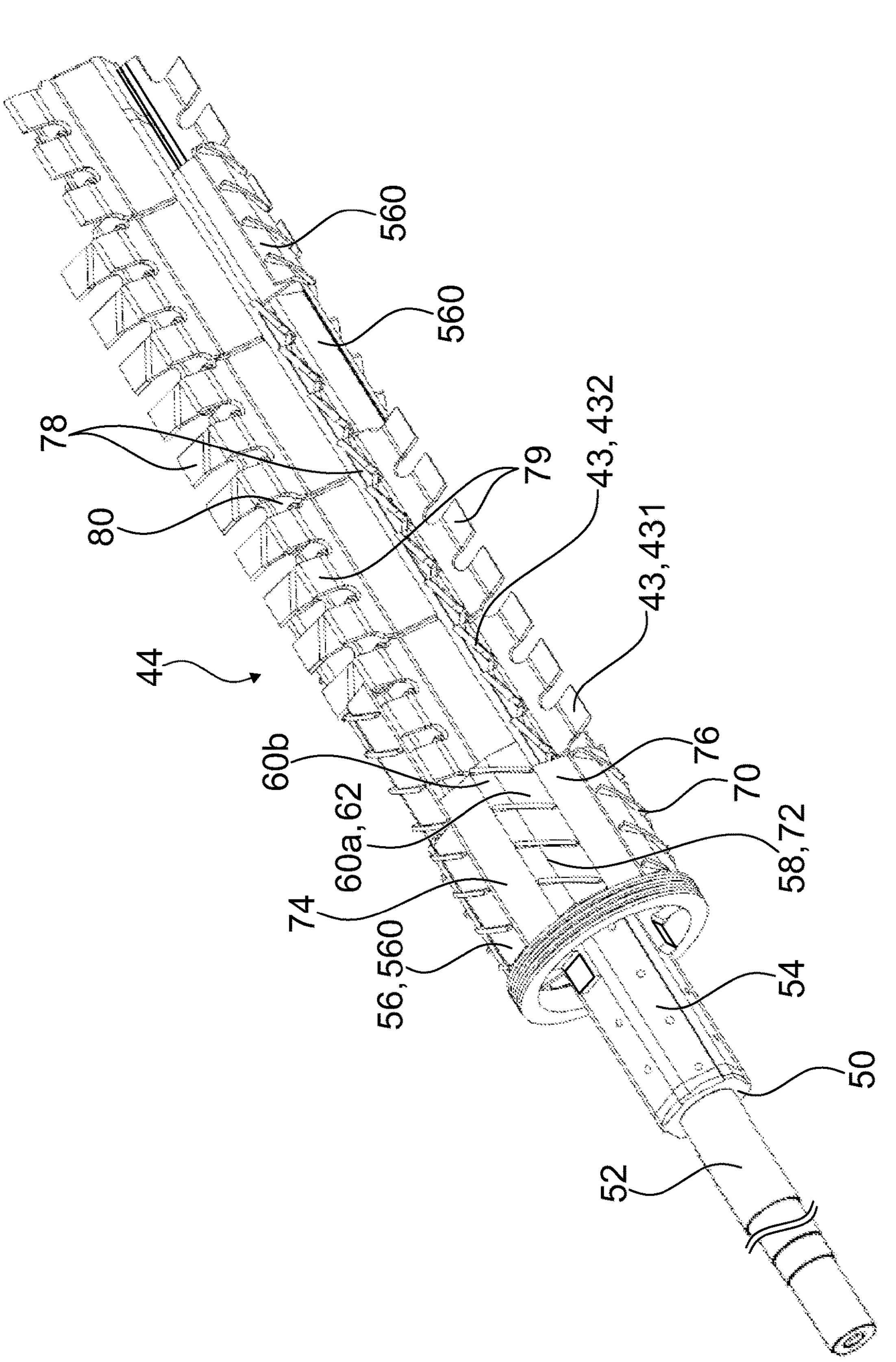
FIG. 5 shows a part of a rotor shaft for the apparatus according to the invention in a perspective view.

A rotor shaft for an apparatus according to the invention is shown in FIG. 5. This has a rotor shaft body 50, which comprises a spindle 52 and six axially running fastening strips 54 welded onto the spindle and distributed over the circumference thereof. Lift elements 56 are flange-mounted onto these fastening strips 54, which lift elements in the specific case shown are provided in the form of pitched-roof-shaped web plates 560, the ridge 58 of which runs at least approximately parallel to the axis direction of the rotor shaft 44.

Due to the angled form, the web plate 560 is thus divided into a first and second web plate surface 60*a*, and 60*b*, which lie in planes running obliquely relative to one another. The leading first web plate surface 60*a* in the rotation direction forms the incident-flow portion 62 of the lift element 56. The leading end 64 of the incident-flow portion 62 in the rotation direction is arranged at a greater distance from the inner surface 15 of the housing casing than a region 66 of the incident-flow portion 62 trailing behind the leading end. A gap 68 that continuously narrows in a direction counter to the rotation direction is thus formed between the incident-flow portion 62 and the inner surface 15 of the housing casing. As the rotor shaft rotates, the highly viscous material that is to be processed is now pressed into the gap 68, whereby the flow force of the rotor shaft 44 acting on the incident-flow portion 62 imparts a hydrodynamic lift component perpendicularly to the incident-flow direction and thus counteracts a deflection of the rotor shaft 44.

Figure 7:
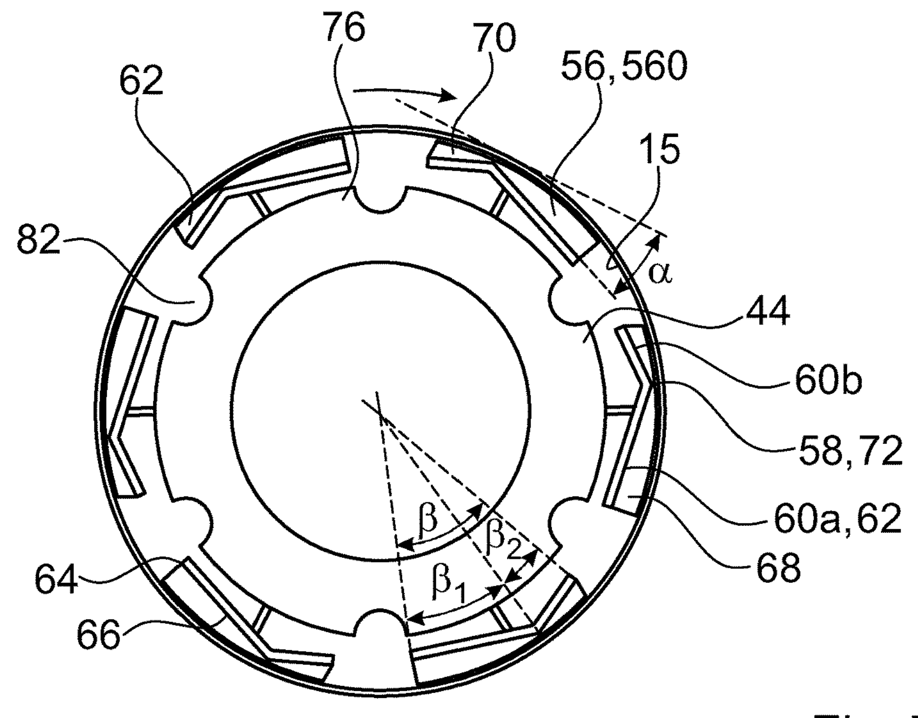
FIG. 7 shows the rotor shaft shown in FIG. 6 and arranged in a process housing in cross-section.

In the case shown specifically in FIG. 7 the first web plate surface 60*a* or the incident-flow portion 62 encloses an angle $\alpha$ with the tangent or the tangential plane of the inner surface 15 of the housing casing and covers an angular range $\beta_1$ of the circumference of the rotor shaft body 50. The trailing web plate surface covers an angular range $\beta_2$. On the whole, the lift element thus covers an angle $\beta$.

Helically running conveying fins 70 are arranged on the radial outer side of the web plates 560 and are oriented in an angled manner in relation to the axis direction of the rotor shaft 44.

The gable 58 of the web plate 560 forms an axially running shearing edge 72, which is set back in relation to the radial outer edge of the conveying fin 70 and thus, in comparison thereto, is arranged at a greater distance from the inner surface 15 of the housing casing.

On the one hand a hydrodynamic lift component in the direction of the central rotor shaft body 50 is thus imparted to the rotor shaft 44 by the web plates 560 arranged on the rotor shaft 44. On the other hand the material is distributed over the inner surface 15 of the housing casing by the axially running shearing edge 72, wherein the material is additionally imparted a conveying component in the direction of the outlet nozzle by the conveying fins 70. Consequently, the web plates 560 functioning as lift elements 56 also constitute sweeper elements for distributing and conveying the material and thus constitute conveying-and-distribution elements.

As can be seen from FIG. 5, the rotor geometry or the sweeper elements 43 arranged on the rotor shaft body are configured differently depending on the zone. Thus, only pitched-roof-shaped web plates 560 are arranged in the inlet zone corresponding to the proximal end region. Specifically, six web plates are distributed over the circumference of the rotor shaft 44, wherein each two web plates arranged successively in the circumferential direction are connected to one another by connection plates 74 in such a way that a protective casing 76 is formed on the whole.

Due to the formation of a protective casing 76, the material to be treated and the gaseous material components escaping during the treatment are guided in the inlet zone 18 in parallel flow, whereby the risk of a possible "material entrainment" by the escaping components is minimised.

Web plates 560 are also arranged in the process zone 25 adjacent to the inlet zone 18, however the web plates are arranged on the rotor shaft body 50 offset from one another helically in the longitudinal portion of the rotor shaft 44 corresponding to the process zone, whereby an optimal distribution of the lift or the lift force generated by the individual lift elements over the entire process zone 25 can be obtained.

In order to attain a sufficiently high conveying effect, further sweeper elements 43 with increased conveying effect are also provided in addition to the web plates 560 functioning as lift element and conveying-and-distribution element. Specifically, sweeper elements 43 which comprise teeth 78, the shearing edge of which have an angle of attack in relation to the axis direction of greater than 5° and thus constitute a conveying element 432, but not a lift element, are also arranged in the process zone 25. Specifically, sweeper blades 80 each having a plurality of teeth 78 and having said angle of attack are provided. Furthermore, sweeper elements 43 with teeth 79 of which the shearing edge runs parallel to the axis direction and thus are neutral in respect of conveyance are provided; these sweeper elements thus constitute purely distribution elements 431. Distribution elements 431 and conveying elements 432 are arranged in alternation in the process zone 25 in the shown embodiment, wherein, as mentioned, a web plate 560 is fixed to one of the six fastening strips 54 or in one of the six rows of blades.

Figure 6:
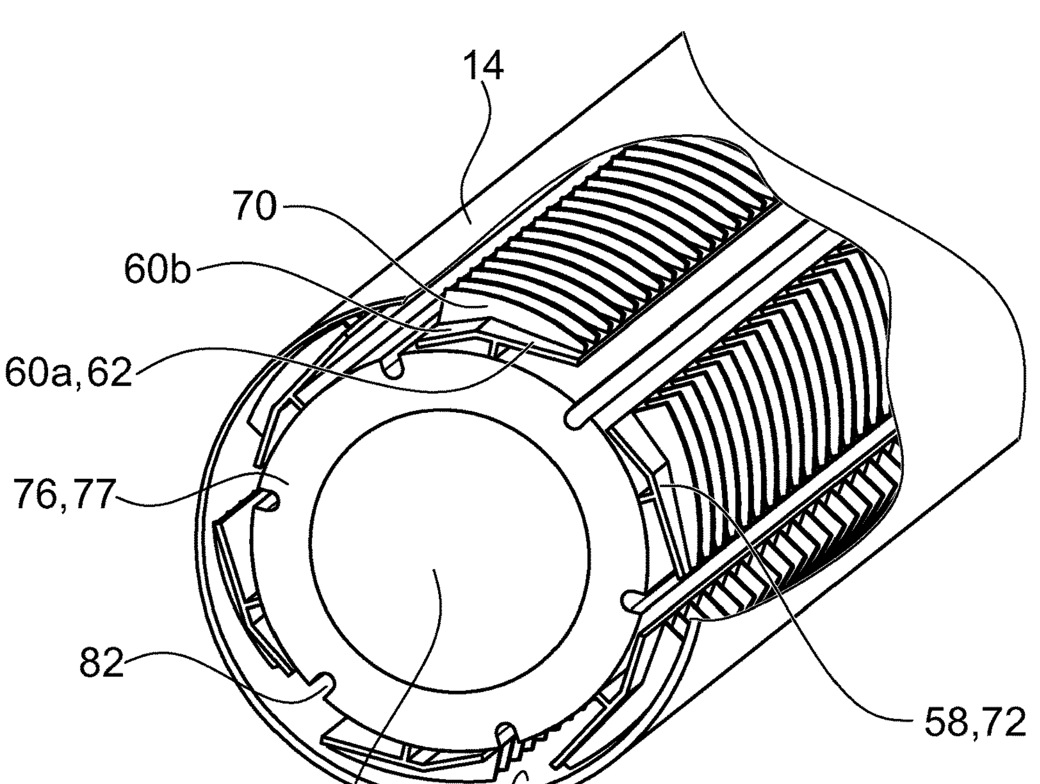
FIG. 6 shows a perspective view of a part of a further rotor shaft of a thin-film treatment apparatus according to the invention in the region corresponding to the inlet zone.

A configuration of the rotor shaft 44 that is particularly preferred for the inlet zone 18 is also shown in FIGS. 6 and 7. Accordingly, a coaxial sleeve 77 is provided, which has web plates 560 protruding radially from it and functions as a protective casing 76. A radially set-back channel 82 is formed on the outer side of the sleeve 77 between each two web plates 560 arranged in succession in the circumferential direction. In accordance with this embodiment the vapours created during the processing of the material may be guided through the channels 82. Once they have reached the end of the protective casing 76, the vapours pass through the interior 84 surrounded by the protective casing 76 or the sleeve 77 to a vapour space separated from the material treatment space 160, generally via a labyrinth seal, where the vapours may be removed via a vapour nozzle 40.

Figure 8:
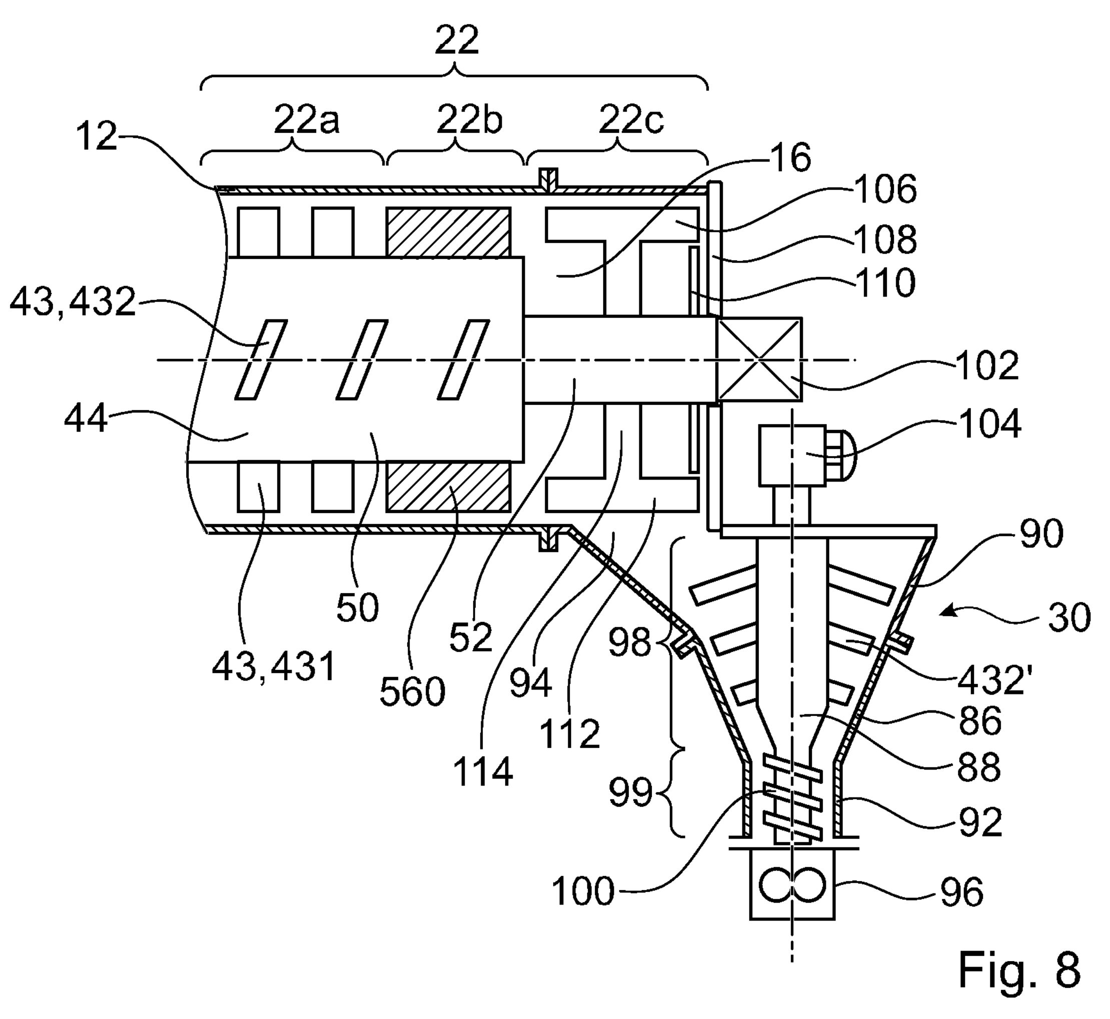
FIG. 8 shows a side view of the outlet zone of a further embodiment of the thin-film treatment apparatus according to the invention with a vertically extending discharge system.
Figure 9:
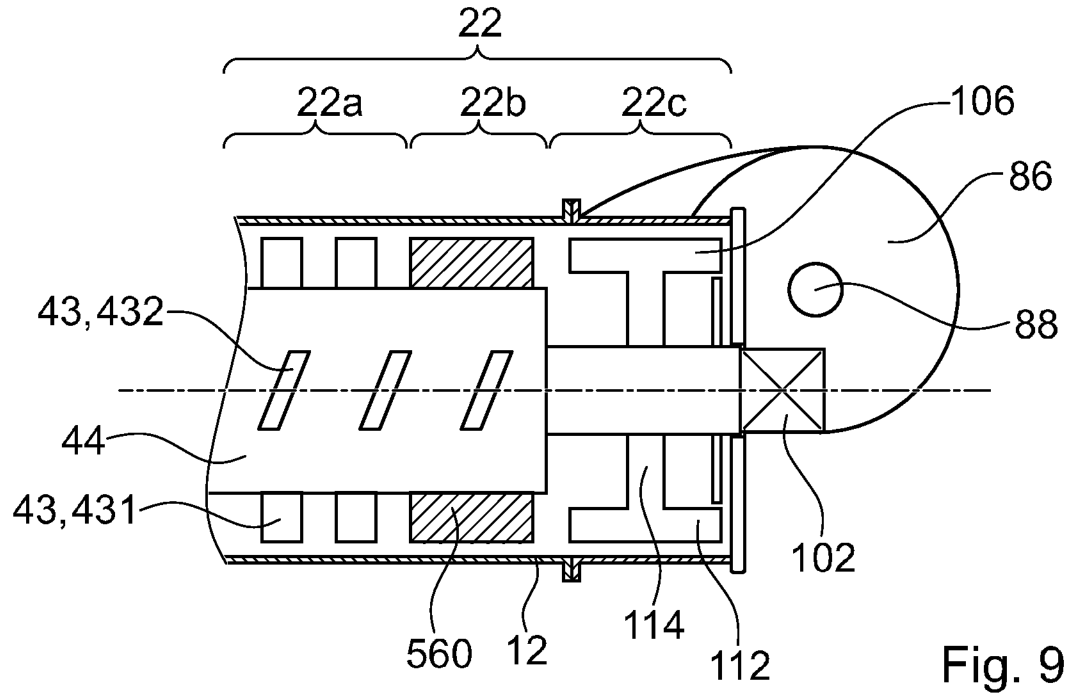
FIG. 9 shows the outlet zone of the embodiment shown in FIG. 8 in a plan view from above.
Figures 10, 11:
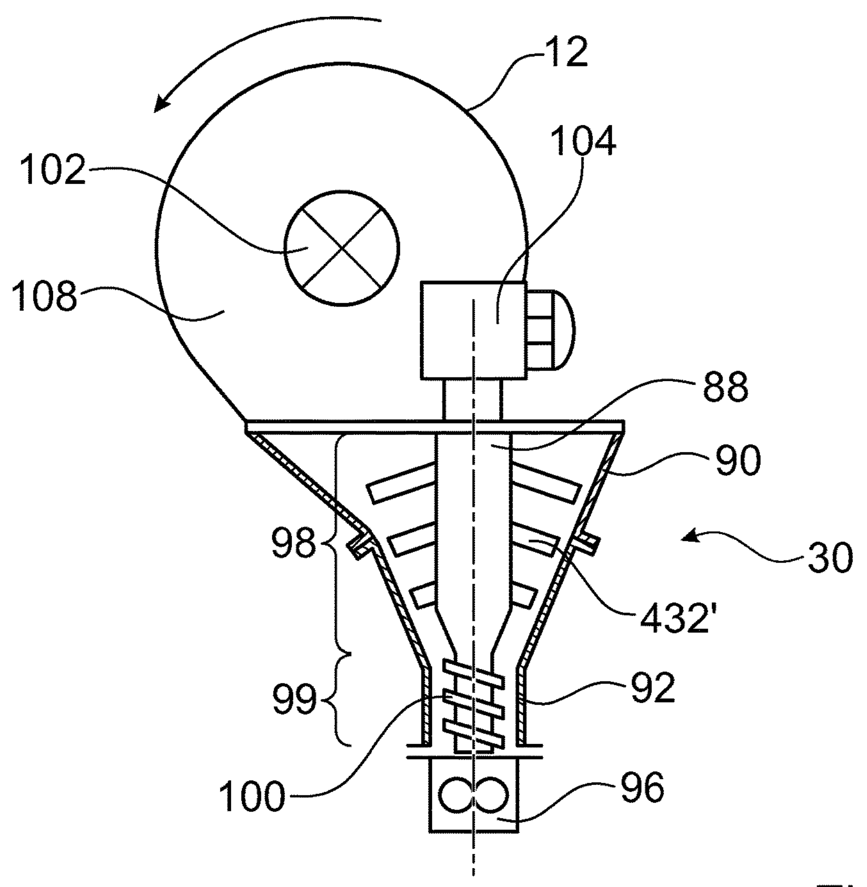
FIG. 10 shows the embodiment shown in FIG. 8 in a plan view from the front.
FIG. 11 shows a side view of the outlet zone of a further embodiment of the thin-film treatment apparatus according to the invention with a horizontally extending discharge system.

Alternatively to the discharge system shown in FIG. 1 to 4 in the form of a twin discharge screw with conveying direction running horizontally and at right angles to the orientation of the process housing, the thin-film treatment apparatus according to the invention can alternatively comprise a discharge system 30 with vertical conveying direction, as is shown in FIG. 8 to 10.

According to this alternative embodiment, the discharge system 30 comprises a funnel 86 with a discharge shaft 88 arranged therein and extending coaxially. The funnel has an approximately conical funnel portion 90, which tapers in the conveying direction, and adjoined thereto a cylindrical funnel portion 92. In its inlet-side (wide) region, the tapering funnel portion 90 has a funnel opening 94, by means of which the funnel 86 is connected to the housing interior 16 of the process housing 12. On the outlet side, the funnel 86 or the cylindrical funnel portion 92 is connected to a discharge pump 96, by means of which the material to be discharged can be removed or fed to further devices, such as a filter and/or a spinning nozzle.

The discharge shaft 88 has a first discharge shaft portion 98, on which there are arranged conveying elements 432', by means of which the material to be discharged is conveyed in direction of the cylindrical funnel portion 92. This cylindrical funnel portion 92 serves as a bearing bush for a second discharge shaft portion 99 arranged therein with a single discharge screw 100 formed thereon for conveying the material towards the discharge pump 96.

As can be seen in particular from FIGS. 9 and 10, the rotor shaft 44 is mounted distally in a rotary bearing, which is arranged on the distal end face of the process housing 12. The funnel 86 is arranged in an offset manner based on the axial direction of the rotor shaft 44 or the process housing 12, in such a way that sufficient space is provided for the discharge shaft 88 extending upwardly next to the distal rotary bearing 102, which discharge shaft is connected at its upper end to a discharge shaft drive 104. Due to the offset arrangement of the funnel or in order to ensure in this arrangement an optimal opening cross-section of the funnel opening, the funnel 86 deviates in its upper inlet-side region from the conical form, as is shown in particular in FIGS. 8 and 9.

In its distal end region, two circumferential reamers 106 are arranged on the rotor shaft body 50, by means of which reamers the material is conveyed into the funnel opening 94 present on the underside of the process housing 12. Specifically, the reamers 106 each have a reamer bar 112, which is secured by means of a reamer arm 114 to the shaft 52 of the rotor shaft body 50 and by means of which the material to be discharged is shifted towards the funnel opening 94.

A plate-like cleaning element 110 is also arranged on the rotor shaft body 50 directly adjacently to the distal end face 108 of the process housing 12, which cleaning element prevents material from depositing on the inner face of the distal end face 108 and which furthermore also protects the distal rotary bearing 102 from being soiled by the material.

As shown in FIGS. 8 and 9, three outlet zone portions 22*a*, 22*b*, 22*c* are present in the outlet zone 22 of the shown embodiment. In the first outlet zone portion 22*a*, sweeper elements 43 are arranged on the corresponding longitudinal portion of the rotor shaft body 50 and comprise teeth, the shearing edges of which are angled by approximately 45° in relation to the axis direction and which thus act as conveying elements 432. Distribution elements 432, specifically sweeper elements with teeth of which the shearing edge runs parallel to the axis direction of the process housing 12 or the rotor shaft 44, are arranged in alternation with the conveying elements 432 in the first outlet zone portion 22*a*. Alternatively, it is also conceivable that only conveying elements 432 are present, whereby an increased conveying effect is produced in the first outlet zone portion 22*a*.

In the second outlet zone portion 22*b* adjoining the first outlet zone portion 22*a* in the conveying direction, the conveying elements 432 alternate in the circumferential direction with web plates 560, as have been described in conjunction with FIG. 5 and which function as lift element and as conveying-and-distribution element.

In the third outlet zone portion 22*c* adjoined thereto in the conveying direction, which third outlet zone leads into the funnel 86, there are in turn arranged merely the above-described reamers 106 on the rotor shaft body. In contrast to the distribution elements 431, which are neutral to the conveying process, present in the first outlet zone portion, further elements are thus provided in the second outlet zone portion additionally to the conveying elements 432 and impart a conveying component on the material, whereby an admissible conveyance to the third outlet zone portion 22*c* or the reamers 106 is then ensured even if the material has a very high viscosity. Whereas the conveying fins discussed in conjunction with FIG. 5 enclose in the process zone only a relatively small angle of, for example, 5° with the axis, this angle is larger for the conveying fins of the web plates 560 arranged in the outlet zone and can be, in particular 45°, whereby a stronger conveying effect as compared to the process zone is obtained.

The embodiment shown in FIG. 8 to 10 has the advantage that the rotational speed of the rotor shaft 44 present in the process housing can be decoupled from that of the discharge shaft 88.

Alternatively to the embodiment shown in FIG. 8 to 10, the discharge system is oriented horizontally in the embodiment shown in FIG. 11. Specifically, the discharge system 30 has a funnel 86' flange-mounted on the process housing, and the rotor shaft 44 protrudes into said funnel. The funnel 86' has a conically tapering funnel portion 90', which is connected at its wide, proximal end by means of a flange connection to the process housing 12, and the axis of which coincides with the axis of the process housing; in the funnel portion 90', the diameter of the rotor shaft 44 tapers accordingly. This conical funnel portion 90' is adjoined in the conveying direction by a cylindrical funnel portion 92', which serves as a bearing bush for the single discharge screw 100' arranged therein.

As described in conjunction with the embodiment shown in FIG. 8 to 10, the outlet zone of the embodiment shown in FIG. 11 also has a first outlet zone portion 22*a*' and a second outlet zone portion 22*b*' adjoining the first outlet zone portion. In this embodiment too, web plates 560 are formed in the second outlet zone portion 22*b*' instead of the distribution elements 431, neutral to the conveying process, present in the first outlet zone portion 22*a*' and said web plates function both as lift elements and as conveying-and-distribution elements. Also in the region of the rotor shaft 44 protruding into the funnel 86'—as in the second outlet zone portion **22*b*'—web plates 560 are also arranged on the rotor shaft body 50 together with the conveying elements 432. Specifically, the web plates 560** are arranged here helically offset in relation to one another.

A thin-film treatment apparatus with an inner diameter of the housing interior of 280 mm, and a circumference of 0.88 m, was used in an experiment for producing a solution of cellulose in NMMNO/water. The horizontal rotor shaft was equipped with different sweeper elements, which were arranged in a maximum of 8 horizontal rows around the rotor shaft, wherein in the process zone each second row of sweeper elements was inclined by an angle of $\alpha$=20°; the rest of the rotor blades were not inclined. The spacing between the outer ends of the sweeper elements from one another was between 108 and 216 mm. The sweeper elements had an area of intervention in the horizontally moved suspension of at most 1.9 $dm^2$, arranged facing the heated casing inner surface and distanced from the casing inner surface of the process housing between 2.75 and 3.5 mm. The horizontally supported rotor was operated at a maximum speed of 650 $min^{-1}$, and therefore the circumferential speed of the tips of the sweeper elements was at most 9.3 m/s and the maximum frequency of succession of the sweeper elements was 2600 per minute. Further parameters are specified in Table 1.

In order to produce the cellulose solution, the used cellulose of the eucalyptus pulp type was suspended in desalinated water. Following complete suspension of the cellulose fibres in the water, the excess water was separated by filtration and the obtained pulp cake was pressed to a solids concentration of approximately 50% cellulose. Following the dewatering, the pulp cake was guided to the defibration via a needle roll and shredder. The resultant, finely defibred moist cellulose was introduced continuously into an aqueous tertiary amine oxide solution (NMMNO) in order to produce the suspension. Ring layer mixers and/or turbulent mixers are apparatuses suitable for this purpose.

The suspension of water, cellulose and NMMNO with different composition (see Table 1, rows b, c, d) was introduced into the thin-film treatment apparatus in a further stage of the process in order to produce the cellulose solution. It has proven to be advantageous if the introduced suspension has a mass-based water content of from 19% to 26%, cellulose content of from 5.7% to 11.9%, and NMMNO content of 65%-75%. A good distribution of the suspension in the feed zone may be achieved with such suspensions.

It was found that the conversion from the starting composition (index in the formula=before) into the target composition (index in the formulas=after) advantageously follows a certain ratio. This ratio has proven to be suitable when the formula $$\frac{c_{H2O,before}}{C_{H2O,after}} = \frac{41.1 + 1.91c_{Cell,before}}{47.9 - 1.43c_{Cell,after}}$$

is satisfied, wherein the difference to 100% in each case is formed by the NMMNO concentrations. All concentrations ($c_{H2O}$, $c_{cell}$) are specified in mass %. Astonishingly, the best results were provided when the ratio of $$\frac{c_{H2O,before}}{C_{H2O,after}}$$

was in the range of from 1.8 to 2.5 and the ratio $$\frac{c_{Cell,before}}{C_{Cell,after}}$$

was 0.8-0.95.

By passing the suspension through the different treatment zones, its composition changes to the target composition. If the target composition is achieved, it does not change further during the course of the present method. This target composition preferably satisfies the formula c(Cell)≤35.9-1.736*c($H_2O$), and/or the formula c(Cell)≥32.4-2.17*c($H_2O$), wherein the c(Cell) is the content in mass % of the cellulose and c($H_2O$) is the content in mass % of the water in the cellulose solution. The starting composition is achieved by mixing the individual components, whereas the target composition is achieved as the present method is carried out. Since the composition forms differently in the individual zones as a result of the physical conditions present, it is advantageous if the parameters and ranges described in the method according to the invention are observed. According to experience the target composition that is sought follows the equation c(H2O)=(33.5−c(Cell)/1.91. The target composition may vary from the target composition that is sought, but should preferably lie in the ranges of the above-specified formulas for the target composition. The target composition is determined at the end of the outlet zone. During the treatment the target composition may be reached at different rates. It is thus advantageous for the present method if this target composition is reached at the end of the process zone. However, it is also quite conceivable that the target composition will be achieved already after a third of the total treatment time. The total treatment time is the period of time that is required by the suspension/solution to pass from the start of the inlet zone to the end of the outlet zone. Once the target composition has been reached, the composition of the cellulose solution does not change further.

In this horizontally configured thin-film evaporator the cellulose solution could be produced continuously in a particle-free manner by intense mixing and kneading action. Treatment times (t) of 150 seconds led to the complete dissolution of the cellulose.

The geometric conditions of the inner surface of the housing casing based on the area of the rotor blade tip (as above) and on the circumferential speed of the rotor blade tip (i.e. at the greatest distance from the axis) provided an effective characteristic value for assessing an economically expedient and simultaneously efficient dissolution of the introduced suspension. An economical method with, at the same time, very good solution quality may be performed with the following values of this parameter. This parameter is defined here as a specific area ratio of the rotor blades (table, row ae):

Spec. area ratio of the rotor blades (table, row ae)=heat exchange area of the inner wall of the housing casing (table, row h)/(rotor blade tip loading area (table, row ad)*blade tip speed (table, row 1)

It has been found that for a good quality, i.e. score <2 of the ready-to-spin solution (table, row x), the spec. area ratio of the rotor blades is preferably less than 10, particularly preferably less than 8, and very particularly preferably less than 5 $m^2s/m^3$. These parameter ranges are thus particularly preferred.

For reliable process management, yet further stabilisers were added to the suspension in order to stabilise the solvent and prevent the cellulose degradation. The continuously produced suspension was converted under application of temperature (u, v, w) and negative pressure (j), and under horizontal shear into a highly viscoelastic solution, wherein excess water was removed at reduced pressure (j) between 45 and 90 mbar. The heating of the device was performed by means of saturated steam at a pressure of 1-2 bar, wherein the steam temperature was between 100° C. and 121° C.

The thickness of the layer spread over the interior was between 2.75 and 3.5 mm (i). Water evaporated by temperature and negative pressure was removed in counter flow to the suspension flow at a temperature of 80-85° C., wherein the steam flow (s) was up to 61.5 kg/h. The shear rate (o) was between 5000 and 21000 $s^{-1}$, wherein the rotor at the speed € consumed an electrical power (f) of −0-37 kW.

At the outlet the finished cellulose solution was discharged (k) using a discharge screw. The discharge screw was used for the transfer from the negative pressure prevailing in the interior to the ambient pressure. Per hour, up to 484 kg of homogeneous cellulose solution could be obtained with a temperature (w) of approximately 100° C. The treatment time (t) of the suspension in the horizontal device was −0-360 seconds.

The highly viscous cellulose solution thus obtained was subjected to the additional process steps of devolatilisation and filtration prior to the spinning. As a result of the microscopic examination of the solution, it was determined that only in Examples 5 and 6 were undissolved cellulose particles present in the solution. To this end the scoring of the ready-to-spin solution (x) followed the following system: The scoring was done under a microscope with scores from 1 to 3. Score 1 means that undissolved particles are no longer present. Score 2 means that a few undissolved particles are present, and score 3 means that a lot of undissolved particles are present. Following filtration all cellulose solutions are suitable for spinning.

The cellulose solution was spun into filaments as described in WO 2013/030399 A and comprises extrusion of the solution through one or more extrusion openings under pressure and solidification of the shaped cellulose bodies in a collection bath, wherein the solution is guided through an air gap between the extrusion openings and the collection bath.

Characteristic Values:

Reynolds Number Rotor (y):

$$Re_{rot} = \frac{\rho \cdot v \cdot d_{rot}}{\eta}$$

$Re_{rot}$=Reynolds number of the rotor [-]
ρ=mean density of the suspension [kg/$m^3$]
v=circumferential speed of the rotor blade tips [m/s]
$d_{rot}$=diameter of the rotor [m]
η=dynamic viscosity of the ready-to-spin solution [Pas]

Reynolds Number Film (z):

$$Re_{film} = \frac{\dot{m}}{D_i \cdot \pi \cdot \eta}$$

$Re_{film}$=Reynolds number of the thin-layer film [-]
$\dot{m}$=mass flow of the fed suspension [kg/s]
$D_i$=diameter of the heated cylinder [m]

Newton Number (aa):

$$Ne = \frac{P}{\rho \cdot n^3 \cdot d_{rot}^4 \cdot l}$$

N=Newton number [-]
n=speed of the rotor [1/s]
l=length of the rotor [m]

$P$=power consumption of the rotor

Euler's Number (ab):

$$Eu = 1.372.\ Re_{rot}^{-0.15}.\ Re_{film}^{0.379}.\ i^{-0.445}$$

Eu=Euler's number
i=number of rotor blades
Pressure calculation in the reactor $$p = 122.\ e^{-0.05c(Cell)}$$

p=absolute pressure in the reactor in mbar.
c(Cell)=cellulose concentration in the suspension in mass %

Spec. Area Ratio of the Rotor Blades (Sweeper Elements):

$$A_R = \frac{A_M}{A_B * v_u}$$

$A_R$ . . . specific area ratio of the rotor blades in $m^2s/m^3$
$A_M$ . . . casing inner surface of the process zone in $m^2$
$A_B$ . . . rotor blade tip loading area in $m^2$
$V_u$, . . . blade tip circumferential speed in m/s

TABLE 1

| | Unit | Letter | Example number | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Suspension feed rate | [kg/h] | a | 100 | 100 | 100 | 100 | 300 | 300 | 300 | 300 | 500 | 500 | 500 | 500 |
| Conc. NMMNO | [mass %] | b | 75.3 | 69.7 | 64.7 | 58 | 75.3 | 69.7 | 64.7 | 58 | 75.3 | 69.7 | 64.7 | 58 |
| Conc. H2O | [mass %] | c | 19 | 21.3 | 23.4 | 26.1 | 19 | 21.3 | 23.4 | 26.1 | 19 | 21.3 | 23.4 | 26.1 |
| Conc. Cell | [mass %] | d | 5.7 | 9 | 11.9 | 15.9 | 5.7 | 9 | 11.9 | 15.9 | 5.7 | 9 | 11.9 | 15.9 |
| Rotational speed | [1/min] | e | 118 | 177 | 236 | 236 | 355 | 414 | 473 | 473 | 532 | 532 | 591 | 650 |
| Power consumption | [kW] | f | 7.4 | 9.25 | 11.1 | 18.5 | 14.8 | 14.8 | 18.5 | 22.2 | 14.8 | 14.8 | 22.2 | 33.3 |
| Inner diameter of the housing interior | [mm] | 9 | 280 | 280 | 280 | 280 | 280 | 280 | 280 | 280 | 280 | 280 | 280 | 280 |
| Heat exchange area of the inner wall | [m$^2$] | h | 0.55 | 0.55 | 0.55 | 0.55 | 0.55 | 0.55 | 0.55 | 0.55 | 0.55 | 0.55 | 0.55 | 0.55 |
| Film thickness of the suspension | [mm] | i | 2.75 | 2.75 | 2.75 | 2.75 | 2.75 | 2.75 | 2.75 | 2.75 | 3.5 | 3.5 | 3.5 | 3.5 |
| Pressure during the reaction | [mbar] | j | 90 | 75 | 60 | 45 | 90 | 75 | 60 | 45 | 90 | 75 | 60 | 45 |
| Solution discharge | [kg/h] | k | 95 | 90 | 85 | 80 | 289 | 280 | 271 | 259 | 484 | 469 | 456 | 439 |
| Blade tip speed | [m/s] | I | 1.70 | 2.55 | 3.40 | 3.40 | 5.10 | 5.95 | 6.79 | 6.79 | 7.60 | 7.60 | 8.45 | 9.29 |
| Blade tip spacing | [mm] | m | 108 | 108 | 108 | 108 | 216 | 216 | 216 | 216 | 214 | 214 | 214 | 214 |
| Blade succession frequency | [1/min] | n | 945 | 1418 | 1891 | 1891 | 1418 | 1655 | 1891 | 1891 | 2127 | 2127 | 2364 | 2600 |
| Shear rate in the process zone | [1/s] | o | 4941 | 7412 | 9883 | 9883 | 14824 | 17295 | 19766 | 19766 | 17376 | 17376 | 19307 | 21237 |
| Feed amount suspension/sweeper element | [kg/h] | P | 1.61 | 1.61 | 1.61 | 1.61 | 7.89 | 7.89 | 7.89 | 7.89 | 13.16 | 13.16 | 13.16 | 13.16 |
| Heat exchange area/sweeper element | [dm$^2$/blade] | q | 0.880 | 0.880 | 0.880 | 0.880 | 1.435 | 1.435 | 1.435 | 1.435 | 1.435 | 1.435 | 1.435 | 1.435 |
| kg/h per m$^2$ cross-sectional area | [kg/hm$^2$] | r | 4987 | 4987 | 4987 | 4987 | 23939 | 23939 | 23939 | 23939 | 39898 | 39898 | 39898 | 39898 |
| Steam flow | [kg/h] | s | 5.3 | 10.2 | 14.7 | 20.5 | 10.7 | 20.5 | 29.3 | 41 | 16 | 30.7 | 44 | 61.5 |
| Treatment time | [s] | t | 225 | 427 | 650 | 912 | 53 | 100 | 153 | 279 | 188 | 231 | 275 | 325 |

TABLE 1-continued

| | | | Example number | | | | | | | | | | | |
|---|---|---|---|---|---|---|---|---|---|---|---|---|---|---|
| | Unit | Letter | 1 | 2 | 3 | 4 | 5 | 6 | 7 | 8 | 9 | 10 | 11 | 12 |
| Temp. inlet zone | [° C.] | u | 80 | 80 | 80 | 80 | 80 | 80 | 80 | 80 | 80 | 80 | 80 | 80 |
| Temp. process zone | [° C.] | v | 100 | 103 | 103 | 110 | 100 | 103 | 103 | 110 | 100 | 103 | 103 | 110 |
| Temp. outlet zone | [° C.] | w | 95 | 99 | 100 | 105 | 98 | 101 | 101 | 106 | 99 | 102 | 102 | 107 |
| Score of the ready-to-spin solution | [−] | x | 1 | 1 | 1 | 1 | 2 | 2 | 1 | 2 | 1-2 | 2 | 2-3 | 2 |
| Reynolds number of the rotor | [−] | y | 0.11 | 0.10 | 0.07 | 0.04 | 0.34 | 0.24 | 0.15 | 0.07 | 0.50 | 0.31 | 0.18 | 0.10 |
| Reynolds number of the film | [−] | z | 6.32E−06 | 3.95E−06 | 2.11E−06 | 1.05E−06 | 1.89E−05 | 1.18E−05 | 6.32E−06 | 3.16E−06 | 3.16E−05 | 1.97E−05 | 1.05E−05 | 5.26E−06 |
| Newton number | [−] | aa | 229 | 85 | 43 | 72 | 17 | 11 | 9 | 11 | 5 | 5 | 6 | 6 |
| Euler's number | [−] | from | 2.60E−03 | 2.75E−03 | 2.28E−03 | 1.94E−03 | 4.18E−03 | 4.56E−03 | 3.87E−03 | 3.30E−03 | 5.94E−03 | 5.34E−03 | 4.55E−03 | 3.83E−03 |
| Discharge at the outlet per $m^2$ of heat exchange area | [kg/h/$m^2$] | ac | 173.6 | 164.7 | 156.4 | 145.8 | 530.5 | 512.5 | 496.4 | 474.9 | 887.5 | 860.5 | 836.1 | 804.0 |
| Rotor blade tip loading area | [$m^2$] | to | 0.02005 | 0.02005 | 0.02005 | 0.02005 | 0.01253 | 0.01253 | 0.01253 | 0.01253 | 0.01253 | 0.01253 | 0.01253 | 0.01253 |
| Spec. area ratio of the rotor blades | [$m^2s/m^3$] | ae | 16.0129 | 10.6752 | 8.00646 | 8.00646 | 8.54023 | 7.32019 | 6.40517 | 6.40517 | 5.72477 | 5.72477 | 5.15229 | 4.68390 |
| Engaging-tip power | kg/$sm^2$ | af | 1.31 | 1.24 | 1.18 | 1.10 | 6.41 | 6.20 | 6.00 | 5.74 | 10.73 | 10.40 | 10.11 | 9.72 |

LIST OF REFERENCE SIGNS

10 thin-film treatment apparatus
12 process housing
14 housing casing
15 inner surface of the housing casing
16; 160 housing interior; material treatment space
18 inlet zone
20 inlet nozzle
22 outlet zone
24 outlet nozzle
25 process zone
26 fixed bearing
28 floating bearing
30; 300 discharge system; twin discharge screw
32 first heat transfer medium inlet
34 first heat transfer medium outlet
36 second heat transfer medium inlet
38 second heat transfer medium outlet
40 vapour nozzle
42 rotor
43 sweeper elements
431, 432 distribution elements, conveying elements
44 rotor shaft
48; 480 drive; spur gear motor
50 rotor shaft body
52 spindle
54 fastening strips
56; 560 lift element; web plate
58 ridge of the web plate
60*a, b* first and second web plate surface
62 incident-flow portion
64 leading end of the incident-flow portion
66 trailing region of the incident-flow portion
68 gap
70 conveying fin
72 axially extending shearing edge of the web plate
74 connection plates
76 protective casing
77 sleeve
78 teeth with angle of attack
79 teeth without angle of attack
80 sweeper blade
82 channel
84 interior of the protective casing
86, 86' funnel
88 discharge shaft
90, 90' tapering funnel portion
92 cylindrical funnel portion
94 funnel opening
96 discharge pump
98 first discharge shaft portion
99 second discharge shaft portion
100 single discharge screw
102 distal rotary bearing
104 discharge shaft drive
106 reamer
108 distal end face of the process housing
110 cleaning element
112 reamer bar
114 reamer arm Preferred Embodiments The invention is preferably defined as follows:

1. A thin-film treatment apparatus for treating viscous material comprising a process housing (12) oriented at an incline to the horizontal of at most 20° with a heatable and/or coolable housing casing (14), which surrounds a rotationally symmetrical housing interior (16) extending in the axial direction and forming a material treatment space (160), an inlet nozzle (20) arranged in an inlet zone (18) of the process housing (12) in order to introduce the material to be treated into the material treatment space (160), an outlet nozzle (24) arranged in an outlet zone (22) of the process housing (12) in order to discharge the treated material from the material treatment space (160), and a drivable rotor shaft (44) arranged in the material treatment space (160) and extending coaxially for producing a material film on the inner surface (15) of the housing casing and for conveying the material in a direction from the inlet zone (18) via a process zone (25) to an outlet zone (22), wherein the rotor shaft (44) comprises a central rotor shaft body (50) and, arranged on the circumference thereof, sweeper elements (43), of which the radially outermost end is distanced from the inner surface (15) of the housing casing, characterised in that the rotor shaft (44) comprises at least one lift element (56) arranged on the rotor shaft body (50), which lift element is designed in such a way as to produce a lifting force in the direction of the rotor shaft body (50) during the rotation of the rotor shaft (44).

2. The thin-film treatment apparatus according to 1, characterised in that the lift element (56) comprises a planar incident-flow portion (62) with a leading end (64) in the rotation direction, which end is arranged at a greater distance from the inner surface (15) of the housing casing than a region (66) of the incident-flow portion (62) trailing behind the leading end, whereby a gap (68) that narrows in a direction opposite the rotation direction is formed between the incident-flow portion (62) and the inner surface (15) of the housing, in particular a continuously narrowing gap.

3. The thin-film treatment apparatus according to 2, characterised in that the incident-flow portion (62) covers an angular range $\beta_1$ of at least 10° of the circumference of the rotor shaft body (50).

4. The thin-film treatment apparatus according to 1 to 3, characterised in that at least a part of the lift elements (56) is formed in each case by a sweeper element (43).

5. The thin-film treatment apparatus according to 1 to 4, characterised in that the lift element (56) comprises an at least approximately pitched-roof-shaped web plate (560), the ridge (58) of which runs at least approximately parallel to the axis direction of the rotor shaft (44).

6. The thin-film treatment apparatus according to 1 to 5, characterised in that the lift element (56), in particular the web plate (560), has at least one helically running conveying fin (70) on its radial outer side.

7. The thin-film treatment apparatus according to 1 to 6, characterised in that at least a part of the lift elements (56) is arranged in a region which lies centrally between the rotary bearings on which the rotor shaft (44) is supported, preferably in the process zone (25).

8. The thin-film treatment apparatus according to 1 to 7, characterised in that at least a part of the lift elements (56) are arranged in the process zone (25) on the rotor shaft body (50) helically offset in relation to one another.

9. The thin-film treatment apparatus according to 1 to 8, characterised in that a concentric protective casing (76) arranged between the inner surface (15) of the housing casing and the rotor shaft body (50) and surrounding the rotor shaft body at least approximately completely is formed in the inlet zone (18).

10. The thin-film treatment apparatus according to 9, characterised in that the protective casing (76) is formed at least in part by a plurality of lift elements (56) distributed in the circumferential direction, in particular web plates (560).

11. The thin-film treatment apparatus according to 10, characterised in that a radially set-back channel (82) is formed between each two lift elements (56), in particular web plates (560), arranged in succession in the circumferential direction.

12. The thin-film treatment apparatus according to 1 to 11, characterised in that the process zone (25) has a distribution zone and a conveying zone arranged downstream in the conveying direction, wherein the ratio of the number of conveying elements (432) to the number of distribution elements (431) is higher in the conveying zone than in the distribution zone.

13. The thin-film treatment apparatus according to 1 to 12, characterised in that the outlet nozzle (24) leads into a discharge system (30) in the form of a single discharge screw or a twin discharge screw (300), preferably with axis direction transverse to the axis direction of the process housing (12).

14. The thin-film treatment apparatus according to 1 to 13, characterised in that it additionally comprises a cleaning apparatus which is configured in such a way that it can be introduced into the process housing (12) and is movable to and fro in the axis direction when the end cover is opened.

15. The thin-film treatment apparatus according to 1 to 14, characterised in that it is designed for thermal fractionation of a substance mixture, and in particular is provided in the form of a thin-film evaporator, a thin-film dryer or a thin-film reactor, preferably in the form of a thin-film evaporator.

16. Use of a thin-film treatment apparatus according to 1 to 15 for the treatment of a material having a viscosity of 100 Pa·s or more at least temporarily during the treatment.

17. A method for producing a solution of cellulose with a solvent from a suspension of cellulose in the solvent and a volatile non-solvent, comprising the introduction of the suspension into an inlet of a thin-film treatment apparatus, application and distribution of the suspension in a film-like form on a housing casing, temperature-controlled using a heat exchanger, by sweeper elements rotating about a common axis in a process housing of the thin-film treatment apparatus, evaporation of volatile non-solvent so that the cellulose is dissolved, and output of the solution of cellulose from the thin-film treatment apparatus through an outlet.

18. The method according to 17, characterised in that at least a part of the sweeper elements cause the cellulose to be advanced in the direction of the outlet so that the discharge at the outlet is between 300 and 600 kg/h, preferably between 350 and 550 kg/h, and particularly preferably between 380 and 480 kg/h cellulose solution per $m^2$ of the temperature-controlled surface of the housing casing.

19. The method according to 17 or 18, characterised in that the temperature of the introduced suspension in the process zone is between 100 and 125° C., preferably between 100 and 110° C., and particularly preferably between 100 and 105° C.

20. The method according to 17 to 19, characterised in that the absolute pressure in the process zone is at least in the range of +/−10%, preferably +/−5%, of the formula p=122*e^−0.05c(Cell)), wherein p is the absolute pressure in mbar and c(Cell) is the cellulose concentration in the suspension in mass %.

21. The method according to 17 to 20, characterised in that the specific area ratio of the rotor blades (table, ae) lies below 10 $m^2s/m^3$, particularly preferably below 8 $m^2s/m^3$, and very particularly preferably below 5 $m^2s/m^3$.

22. The method according to 17 to 21, characterised in that the rotor blade tip loading area (table, ad) lies in a range of from 0.02 $m^2$ to 6 $m^2$, preferably in a range of 2 $m^2$-6 $m^2$ and particularly preferably in a range of 4 $m^2$-6 $m^2$.

23. The method according to 17 to 22, a) characterised in that the specific loading in the inlet zone is 80 kg/h/$dm^3$-380 kg/h/$dm^3$, preferably 120 kg/h/$dm^3$-370 kg/h/$dm^3$, and particularly preferably 150 kg/h/$dm^3$-350 kg/h/$dm^3$;

b) characterised in that the specific loading in the process zone is 65 kg/h/$dm^3$-260 kg/h/$dm^3$, preferably 70 kg/h/$dm^3$-200 kg/h/$dm^3$, and particularly preferably 80 kg/h/$dm^3$-150 kg/h/$dm^3$;

c) characterised in that the specific loading in the outlet zone is 2 kg/h/$dm^3$-125 kg/h/$dm^3$, preferably 5 kg/h/$dm^3$-100 kg/h/$dm^3$, and particularly preferably 10 kg/h/$dm^3$-50 kg/h/$dm^3$;

d) characterised in that the specific loading in the post-processing zone is 0 kg/h/$dm^3$-500 kg/h/$dm^3$, particularly preferably 0 kg/h/$dm^3$-250 kg/h/$dm^3$.

24. The method according to 17-23, characterised in that the total treatment time of the cellulose solution is at least 60 s, preferably greater than 100 s, and particularly preferably from 100 to 1000 s.

25. The method according to 17 to 24, characterised in that the ratio of starting composition to target composition follows formula $$\frac{c_{H2O,before}}{c_{H2O,after}} = \frac{41.1 + 1.91c_{Cell,before}}{47.9 - 1.43c_{Cell,after}},$$

before wherein c(Cell) is the concentration of the cellulose in the solution and c(H2O) is the concentration of water in the solution, specified in each case in mass %.

26. The method according to 17 to 25, a) characterised in that the ratio of $$\frac{c_{H2O,before}}{c_{H2O,after}}$$

lies in the range of from 1.8 to 2.5, particularly preferably in the range of 2.1-2.4;

b) characterised in that the ratio of $$\frac{c_{Cell,before}}{c_{Cell,after}}$$

lies in the range of from 0.8 to 0.95, particularly preferably in the range of 0.8-0.88.

27. The method according to 17 to 26, characterised in that the tip efficiency lies in the range of from 1.1 kg/$sm^2$-5.5 kg/$sm^2$, preferably between 1.1 kg/$sm^2$-2.8 kg/$sm^2$, and particularly preferably between 1.1 kg/$sm^2$ and 1.4 kg/$sm^2$.

28. The method according to 17 to 27, characterised in that the target composition is achieved preferably after at least ⅓ of the total treatment time, preferably after ⅔ of the total treatment time, particularly preferably at the end of the process zone.

29. The method according to 17 to 28, characterised in that the length of the housing casing, temperature-controlled using a heat exchanger, from the inlet to the outlet is 0.5 m or more, preferably 1 m to 20 m.

30. The method according to 17 to 29, characterised in that the surface of the housing casing, temperature-controlled using a heat exchanger, is 0.5 $m^2$ to 150 $m^2$, preferably 60 $m^2$ to 125 $m^2$.

31. The method according to 17 to 30, characterised in that the radially outermost end of the sweeper elements is moved at a speed of from 1.5 m/s to 12.5 m/s by the rotation of the sweeper elements.

32. The method according to 17 to 31, characterised in that sweeper elements are moved at a frequency of from 1500 to 4000 per min in succession over a portion of the housing casing temperature-controlled using a heat exchanger.

33. The method according to 17 to 32, characterised in that directly successive sweeper elements follow on from one another with a spacing of from 100 mm to 300 mm between the radially outermost ends of the sweeper elements.

34. The method according to 17 to 33, characterised in that 1.5 kg/h to 20 kg/h suspension are introduced at the inlet per sweeper element.

35. The method according to 17 to 34, characterised in that the suspension is applied with a film thickness of from 1 mm to 50 mm, preferably 2.0 mm to 15 mm.

36. The method according to 17 to 35, characterised in that a sweeper element is in contact with the suspension or solution on average over an area of from 0.8 $dm^2$ to 2 $dm^2$.

37. The method according to 17 to 36, characterised in that the suspension has a film thickness according to the formula $s=(\ln(m_s/60))/x$, wherein s is the film thickness in mm, $m_s$ is the conveyed flow of the suspension, and x is a constant from 0.45 to 7, preferably of 0.5866.

38. The method according to 17 to 37, characterised in that 300 kg to 100000 kg, preferably 10000 kg to 50000 kg suspension are introduced per hour.

39. The method according to 17 to 38, characterised in that the common axis of the rotating sweeper elements is inclined by at most 20° to the horizontal.

40. The method according to 17 to 39 with a thin-film treatment apparatus according to any one of points 1 to 15.

The invention claimed is:

1. A method for producing a solution of cellulose with a solvent from a suspension of cellulose in the solvent and a volatile non-solvent, comprising:

introducing the suspension into an inlet of a thin-film treatment apparatus;

applying and distributing the suspension in a film-like form on a housing casing which is temperature-controlled by a heat exchanger, by sweeper elements rotating about a common axis in a process housing of the thin-film treatment apparatus;

evaporating volatile non-solvent so that the cellulose is dissolved; and outputting the solution of cellulose from the thin-film treatment apparatus through an outlet;

wherein at least a part of the sweeper elements cause the cellulose to be advanced in the direction of the outlet so that the discharge at the outlet is between 30 and 600 kg/h cellulose solution per $m^2$ of the temperature-controlled surface of the housing casing, and wherein the specific area ratio of the rotor blades is below 10 $m^2s/m^3$, wherein the specific area ratio of the rotor blades results from a heat exchange area of an inner wall of the housing casing per the product of a rotor blade tip loading area and a blade tip speed, wherein the rotor blade tip loading area is the sum of tip areas of all rotor blades in a process zone of the thin-film treatment apparatus and a tip area is the area of a rotor blade which is opposite the inner surface of the housing casing.

2. The method according to claim 1, wherein at least a part of the sweeper elements cause the cellulose to be advanced in the direction of the outlet so that the discharge at the outlet is between 350 and 550 kg/h cellulose solution per $m^2$ of the temperature-controlled surface of the housing casing.

3. The method according to claim 1, wherein the temperature of the introduced suspension in the process zone is between 80° C. and 125° C.

4. The method according to claim 1, wherein the absolute pressure in the process zone is at least in the range of +/−10% of the formula p=122*e^-0.05c (Cell)), wherein p is the absolute pressure in mbar and c (Cell) is the cellulose concentration in the suspension in mass %.

5. The method according to claim 1, wherein the specific area ratio of the rotor blades is below 8 $m^2s/m^3$.

6. The method according to claim 1, wherein the rotor blade tip loading area is in a range of from 0.02 $m^2$ to 6 $m^2$.

7. The method according to claim 1, a) wherein the specific loading in an inlet zone of the thin-film treatment apparatus is 80 kg/h/$dm^3$-380 kg/h/$dm^3$;

b) wherein the specific loading in a process zone of the thin-film treatment apparatus is 65 kg/h/$dm^3$-260 kg/h/$dm^3$;

c) wherein the specific loading in an outlet zone of the thin-film treatment apparatus is 2 kg/h/$dm^3$-125 kg/h/$dm^3$; and d) wherein the specific loading in a post-processing zone of the thin-film treatment apparatus is 0 kg/h/$dm^3$-500 kg/h/$dm^3$.

8. The method according to claim 1, wherein the total treatment time of the cellulose solution is at least 60 s.

9. The method according to claim 1, wherein the ratio of starting composition to target composition follows formula, $$\frac{c_{H2O,before}}{c_{H2O,after}} = \frac{41.1 + 1.91c_{Cell,before}}{47.9 - 1.43c_{Cell,after}},$$

wherein c (Cell) is the concentration of the cellulose in the solution and c(H2O) is the concentration of water in the solution, specified in each case in mass %.

10. The method according to claim 9, a) wherein the ratio of $$\frac{c_{H2O,before}}{c_{H2O,after}}$$

lies in the range of from 1.8 to 2.5;

b) wherein the ratio of $$\frac{c_{Cell,before}}{c_{Cell,after}}$$

lies in the range of from 0.8 to 0.95.

11. The method according to claim 1, wherein a tip efficiency of the thin-film treatment apparatus lies in the range of from 1.1 kg/sm$^2$-5.5 kg/sm$^2$.

12. The method according to claim 1, wherein a target composition is achieved after at least ⅓ of the total treatment time.

13. The method according to claim 1, wherein the length of the housing casing, which is temperature-controlled using a heat exchanger, from the inlet to the outlet is 0.5 m or more.

14. The method according to claim 1, wherein a surface of the housing casing, which is temperature-controlled using a heat exchanger, is 0.5 m$^2$ to 150 m$^2$.

15. The method according to claim 1, wherein the radially outermost end of the sweeper elements is moved at a speed of from 1.5 m/s to 12.5 m/s by the rotation of the sweeper elements.

16. The method according to claim 1, wherein sweeper elements are moved at a frequency of from 1500 to 4000 per min in succession over a portion of the housing casing temperature-controlled using a heat exchanger.

17. The method according to claim 1, wherein directly successive sweeper elements follow on from one another with a spacing of from 100 mm to 300 mm between the radially outermost ends of the sweeper elements.

18. The method according to claim 1, wherein 1.5 kg/h to 20 kg/h suspension are introduced at the inlet per sweeper element.

19. The method according to claim 1, wherein the suspension is applied with a film thickness of from 1 mm to 50 mm.

20. The method according to claim 1, wherein a sweeper element is in contact with the suspension or solution on average over an area of from 0.8 dm$^2$ to 2 dm$^2$.

21. The method according to claim 1, wherein the suspension has a film thickness according to the formula $s=(\ln(m_s/60))/x$, wherein s is the film thickness in mm, $m_s$ is the conveyed flow of the suspension, and x is a constant from 0.45 to 7.

22. The method according to claim 1, wherein 300 kg to 100000 kg suspension are introduced per hour.

23. The method according to claim 1, wherein the common axis of the rotating sweeper elements is inclined by at most 20° to the horizontal.

24. The method according to claim 1, practiced with a thin-film treatment apparatus including a process housing oriented at an incline to the horizontal of at most 20° with a heatable and/or coolable housing casing, which surrounds a rotationally symmetrical housing interior extending in the axial direction and forming a material treatment space;

an inlet nozzle arranged in an inlet zone of the process housing in order to introduce the material to be treated into the material treatment space;

an outlet nozzle arranged in an outlet zone of the process housing in order to discharge the treated material from the material treatment space; and a drivable rotor shaft arranged in the material treatment space and extending coaxially for producing a material film on the inner surface of the housing casing and for conveying the material in a direction from the inlet zone via a process zone to an outlet zone, wherein the rotor shaft comprises a central rotor shaft body and, arranged on the circumference thereof, sweeper elements, of which the radially outermost end is distanced from the inner surface of the housing casing;

wherein the rotor shaft comprises at least one lift element arranged on the rotor shaft body, which lift element is designed in such a way as to produce a lifting force in the direction of the rotor shaft body during the rotation of the rotor shaft.

* * * * *